(12) United States Patent
Tajima

(10) Patent No.: US 10,962,049 B2
(45) Date of Patent: Mar. 30, 2021

(54) FIXING MEMBER, SELF-ALIGNING BEARING MECHANISM, ACTUATOR, AND LAMP

(71) Applicant: KOITO MANUFACTURING CO., LTD., Tokyo (JP)

(72) Inventor: Keiichi Tajima, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 190 days.

(21) Appl. No.: 16/062,186

(22) PCT Filed: Dec. 2, 2016

(86) PCT No.: PCT/JP2016/085932
§ 371 (c)(1),
(2) Date: Jun. 14, 2018

(87) PCT Pub. No.: WO2017/110426
PCT Pub. Date: Jun. 29, 2017

(65) Prior Publication Data
US 2018/0372149 A1 Dec. 27, 2018

(30) Foreign Application Priority Data

Dec. 25, 2015 (JP) .............................. JP2015-253499
Dec. 25, 2015 (JP) .............................. JP2015-253500
Dec. 25, 2015 (JP) .............................. JP2015-253501

(51) Int. Cl.
*F16C 11/06* (2006.01)
*F16H 25/20* (2006.01)
(Continued)

(52) U.S. Cl.
CPC ........ *F16C 11/0695* (2013.01); *B60Q 1/0683* (2013.01); *B60Q 1/076* (2013.01);
(Continued)

(58) Field of Classification Search
CPC .. B60Q 1/0683; B60Q 1/076; F16H 2025/209
See application file for complete search history.

(56) References Cited

U.S. PATENT DOCUMENTS

| 3,035,160 A * | 5/1962 | Cleminshaw | ........ B60Q 1/076 362/143 |
| 7,315,127 B2 * | 1/2008 | Tajima | ........ B60Q 1/076 315/82 |

(Continued)

FOREIGN PATENT DOCUMENTS

| CN | 101162080 A | 4/2008 |
| CN | 101191610 A | 6/2008 |

(Continued)

OTHER PUBLICATIONS

Partial Supplementary Search Report dated Jul. 10, 2019 in European Application No. 16878319.9.

(Continued)

*Primary Examiner* — Alexander K Garlen
(74) *Attorney, Agent, or Firm* — Sughrue Mion, PLLC

(57) ABSTRACT

An actuator includes: an output unit 30 having an output shaft 33; and a first worm 40 and a second worm 50 extending along a face perpendicular to the output shaft 33, wherein: the output unit 30 includes a rotating mechanism 34*a* configured to be meshed with the first worm 40 to rotate the output shaft 33 about a predetermined rotation axis 33*a*, and a moving mechanism 39 configured to be meshed with the second worm 50 to move the output shaft 33 in a direction orthogonal to the rotation axis 33*a*; the first worm 40 and the second worm 50 are placed to sandwich the output shaft 33; and a distance between the second worm 50 and the output shaft 33 is shorter than a distance between the first worm 40 and the output shaft 33.

4 Claims, 16 Drawing Sheets

(51) Int. Cl.
   *H02K 7/116* (2006.01)
   *F16H 1/16* (2006.01)
   *F16C 23/04* (2006.01)
   *F21S 41/00* (2018.01)
   *H02K 5/167* (2006.01)
   *F21S 41/657* (2018.01)
   *B60Q 1/068* (2006.01)
   *B60Q 1/076* (2006.01)
   *F16H 19/08* (2006.01)
   *H02K 7/08* (2006.01)
   *F16C 25/04* (2006.01)

(52) U.S. Cl.
   CPC ............ *F16C 23/043* (2013.01); *F16H 1/16* (2013.01); *F16H 19/08* (2013.01); *F16H 25/20* (2013.01); *F21S 41/00* (2018.01); *F21S 41/657* (2018.01); *H02K 5/167* (2013.01); *H02K 7/1166* (2013.01); *B60Q 2200/32* (2013.01); *F16C 25/04* (2013.01); *F16H 2025/209* (2013.01); *H02K 7/08* (2013.01); *H02K 2205/03* (2013.01)

(56) References Cited

U.S. PATENT DOCUMENTS

| | | | | |
|---|---|---|---|---|
| 8,480,270 B2* | 7/2013 | Mochizuki | ............ | B60Q 1/076 362/465 |
| 2001/0017953 A1 | 8/2001 | Harita et al. | | |
| 2008/0106909 A1* | 5/2008 | Kusagaya | ............ | B60Q 1/0683 362/524 |
| 2008/0112179 A1* | 5/2008 | Tatara | .................... | B60Q 1/076 362/515 |
| 2008/0112181 A1* | 5/2008 | Tatara | .................. | B60Q 1/0683 362/524 |
| 2008/0130301 A1* | 6/2008 | Kusagaya | ............. | B60Q 1/076 362/466 |
| 2008/0225543 A1* | 9/2008 | Kuwahara | ................ | B60Q 1/10 362/523 |
| 2014/0198516 A1* | 7/2014 | Tajima | .................... | F16H 19/08 362/523 |
| 2015/0217676 A1 | 8/2015 | Tajima | | |

FOREIGN PATENT DOCUMENTS

| | | |
|---|---|---|
| CN | 201535481 U | 7/2010 |
| CN | 202806532 A | 3/2013 |
| CN | 103782087 A | 5/2014 |
| CN | 104819436 A | 8/2015 |
| EP | 0542450 A1 | 5/1993 |
| EP | 1 772 311 A1 | 4/2007 |
| EP | 2 754 951 A1 | 7/2014 |
| JP | 64-17847 U | 1/1989 |
| JP | 1-158336 U | 11/1989 |
| JP | 10-24765 A | 1/1998 |
| JP | 2000-355245 A | 12/2000 |
| JP | 3193638 B2 | 7/2001 |
| JP | 2008-140650 A | 6/2008 |
| JP | 2009-183033 A | 8/2009 |
| JP | 2010-135119 A | 6/2010 |
| JP | 5779479 B2 | 9/2015 |
| WO | 2013/035798 A1 | 3/2013 |

OTHER PUBLICATIONS

International Search Report for PCT/JP2016/085932 dated Feb. 21, 2017 [PCT/ISA/210].

Extended European Search Report dated Oct. 17, 2019 issued by the European Patent Office in counterpart European Application No. 16878319.9.

Communication dated Apr. 21, 2020, from the Japanese Patent Office in Application No. 2017-557841.

Communication dated Jun. 23, 2020 by the State Intellectual Property Office of People's Republic of China in application No. 201680071974.6.

* cited by examiner

FIXING MEMBER, SELF-ALIGNING BEARING MECHANISM, ACTUATOR, AND LAMP

CROSS REFERENCE TO RELATED APPLICATIONS

This application is a National Stage of International Application No. PCT/JP2016/085932 filed Dec. 2, 2016, claiming priority based on Japanese Patent Application No. 2015-253499 filed Dec. 25, 2015, Japanese Patent Application No. 2015-253500 filed Dec. 25, 2015 and Japanese Patent Application No. 2015-253501 filed Dec. 25, 2015.

TECHNICAL FIELD

The present invention relates to a fixing member, a self-aligning bearing mechanism, an actuator, and a lamp equipped with the actuator.

BACKGROUND ART

Some of vehicle headlights have a function that can appropriately change the direction of a light beam to be emitted. The direction of the light beam to be emitted from the vehicle headlight is preferably vertically changed corresponding to a change in the weight of a driver and passengers or loads, or corresponding to a change in the vehicle attitude due to acceleration or deceleration, for example. When a vehicle turns from side to side, vehicle headlights preferably light the traveling direction of the vehicle in such a manner that the direction of the light beam to be emitted from the vehicle headlight follows the turns from side to side. An example of a method of implementing the function of changing the direction of light beam emission includes a method using an actuator that freely moves a lamp unit equipped with a light source. The actuator is configured to laterally and vertically move the direction of a light beam to be emitted from the lamp unit by moving the lamp unit.

An example of the actuator includes one disclosed in Patent Literature 1 below. Patent Literature 1 below discloses an actuator including an output shaft connected to a lamp unit, a worm gear that rotates the output shaft about a predetermined rotation axis, and a worm gear that moves the output shaft in the direction orthogonal to the rotation axis. The actuator is reduced in size in which a mechanism that rotates the output shaft is integrated with a mechanism that moves the output shaft in the direction orthogonal to the rotation axis of the rotation.
[Patent Literature 1] JP 5779479 B2

SUMMARY OF INVENTION

An actuator of the present invention includes: an output unit having an output shaft; and a first worm and a second worm extending along a face perpendicular to the output shaft, wherein: the output unit includes a rotating mechanism configured to be meshed with the first worm to rotate the output shaft about a predetermined rotation axis, and a moving mechanism configured to be meshed with the second worm to move the output shaft in a direction orthogonal to the rotation axis; the first worm and the second worm are placed to sandwich the output shaft; and a distance between the second worm and the output shaft is shorter than a distance between the first worm and the output shaft.

In the actuator, the second worm is meshed with the moving mechanism provided on the output unit, and moves the output shaft in the direction orthogonal to the rotation axis of the output shaft. At this time, the force of the second worm in the rotation direction is also applied to the rotation axis. However, in the actuator, since the distance between the output shaft and the second worm is short, the force conducted from the second worm to the output shaft is small, and this eliminates a rattle of the output shaft.

Furthermore, in the actuator, it is preferable that the moving mechanism has a helical gear rack formed on face opposed to the second worm in the output unit, the helical gear rack configured to be meshed with the second worm.

The helical gear rack easily secures the relative moving range of the member including the helical gear rack to the worm even though the distance to the worm meshed with the helical gear rack is short. Thus, the helical gear rack formed on the output unit is used as a moving mechanism that moves the output shaft in a predetermined direction, and this easily secures the moving range of the output shaft even though the helical gear rack is provided at the position near the output shaft. Therefore, the second worm is easily brought close to the output shaft, and this more easily achieves the elimination of a rattle of the output shaft.

Furthermore, in the actuator, it is preferable that the helical gear rack is formed on a shortest line connecting the output shaft to the second worm.

Since the helical gear rack that functions as a moving mechanism is formed on the shortest line connecting the output shaft to the second worm, the distance between the point of action at which the helical gear rack is meshed with the second worm and the output shaft is shortened, and this more easily achieves the elimination of a rattle of the output shaft.

Furthermore, in the actuator, it is preferable that the actuator has a circuit board; the first worm and the second worm are placed on one face side of the circuit board; and in electronic components placed on the circuit board, an electronic component is placed protruding above a position where the first worm or the second worm is placed, and the electronic component is placed on an opposite side of the output shaft of the second worm.

Since a tall electronic component, such as a radial component, is placed in a space that is provided by placing the second worm close to the output shaft side, the space is effectively used, and this easily achieves a reduction in the size of the actuator.

Furthermore, a lamp of the present invention includes: the actuator; and a lamp unit having a light source, the lamp unit being connected to the output shaft of the actuator.

A rattle of the output shaft of the actuator connected to the lamp unit is eliminated as described above, and this improves the stability of the operation of the lamp unit.

A self-aligning bearing mechanism of the present invention includes: a bearing; and a bearing accommodating part configured to accommodate the bearing, wherein: the bearing accommodating part has a bearing holding space configured to hold the bearing when the bearing is used; when the bearing is inserted into the bearing holding space from an outside, a longitudinal direction of a shaft to be inserted into the bearing is defined as a first axial direction; when the bearing is used, a longitudinal direction of a shaft to be inserted into the bearing is defined as a second axial direction; under the definitions, the first axial direction and the second axial direction are directions intersecting with each other; the bearing holding space is a space in which the bearing is rotatable in a manner that the longitudinal direction of the shaft to be inserted into the bearing is turned from the first axial direction to the second axial direction; and an inner wall forming the bearing holding space regulates movement of the bearing in the second axial direction when the bearing is used.

In the self-aligning bearing mechanism, the bearing held in the bearing holding space is rotatable at least in the range in which the longitudinal direction of the shaft inserted into the bearing is turned from the first axial direction to the second axial direction. That is, the bearing is rotatable about the center of the bearing to some extent in the bearing holding space. Therefore, in accordance with the self-aligning bearing mechanism, even though the direction of the shaft inserted into the bearing is tilted to the designed orientation more or less, the bearing held in the bearing holding space can follow the tilt of the shaft, and thus the centering of the shaft is easily achieved. The orientation when the bearing is inserted is different from the orientation when the bearing is used, the movement of the bearing in the center axis direction of the bearing is regulated in the orientation when the bearing is used, and thus the bearing can be inserted and fixed with no use of another member.

Furthermore, in the self-aligning bearing mechanism, it is preferable that one side of the bearing accommodating part along the first axial direction is opened in a width in which at least the shaft to be inserted into the bearing is passed, in a section in which the bearing reaches the bearing holding space from the outside.

As described above, a part of the bearing accommodating part is opened. Thus, the bearing can be passed to the bearing holding space with the shaft inserted into the bearing, and the bearing can be rotated in such a manner that the center axis of the bearing is turned from the first axial direction to the second axial direction in the bearing holding space with the shaft inserted into the bearing. Therefore, with the shaft inserted into the bearing, the bearing can be moved and rotated with the shaft in hand, and this easily achieves the installation of the bearing.

Furthermore, in the self-aligning bearing mechanism, it is preferable that an outer shape of the bearing has a curved surface in which a center part protrudes above two end portions in the longitudinal direction of the shaft to be inserted into the bearing.

The outer shape of the bearing has the curved surface as described above, and this easily achieves the rotation of the bearing in the bearing holding space. The outer shape of the bearing has the curved surface, and this easily increases the contact area of the inner wall of the bearing holding space with the bearing. Thus, the movement of the bearing is easily regulated.

Furthermore, in the self-aligning bearing mechanism, it is preferable that the first axial direction is orthogonal to the second axial direction.

As described above, the movement of the bearing is regulated in the orientation when the bearing is used. Here, with the form in which the first axial direction is orthogonal to the second axial direction as described above, the orientation of the bearing when the bearing is inserted into the bearing holding space is greatly different from the orientation of the bearing when the bearing is used, and this easily eliminates the unintentional removal of the bearing from the bearing holding space.

Furthermore, an actuator of the present invention includes an output unit having the self-aligning bearing mechanism, wherein the output unit is moved along a guide shaft to be inserted into the bearing.

As described above, with the use of the self-aligning bearing mechanism having a simple structure, an actuator of high operational accuracy and excellent productivity can be provided.

Furthermore, a lamp of the present invention includes: the actuator; and a lamp unit having a light source, the lamp unit being connected to the output unit of the actuator.

As described above, with the use of an actuator of high operational accuracy, the operation of the lamp unit is stabilized.

Furthermore, a fixing member of the present invention is a fixing member configured to rotatably fix a rotating member to a support, wherein: the fixing member holds the rotating member in a manner that the fixing member regulates movement of the rotating member in a rotation axis direction; and the fixing member has an inner circumferential surface to rotatably hold the rotating member, and an outer circumferential surface on which an engaging part to be engaged with the support is provided.

The fixing member serves as both the bearing and the antislip-off part of the rotating member using an integrated member. As described above, one member serves as both the bearing and the antislip-off part of the rotating member, and this easily achieves the highly accurate fixing of the rotating member.

Preferably, the fixing member is rotated about the rotation axis of the rotating member to engage the engaging part with the support for fixing.

With a form in which the fixing member is rotated about the rotation axis of the rotating member and fixed to the support, the direction of the rotation axis of the rotating member is not prone to be displaced in fixing the fixing member to the support, and this more easily achieves the highly accurate fixing of the rotating member.

Furthermore, an actuator of the present invention includes: an output unit having an output shaft; and a worm configured to rotate the output shaft, wherein: the worm is rotatably fixed to the output unit while movement in a rotation axis direction of the worm is regulated by a fixing member; the fixing member has an inner circumferential surface to rotatably hold the worm, and an outer circumferential surface on which an engaging part to be engaged with the output unit is provided; and the fixing member is fixed by engaging the engaging part with the output unit.

The worm that is a rotating member is fixed using the fixing member that enables the highly accurate fixing of the rotating member as described above, and this enables the improvement of the operational accuracy of the output shaft driven by the worm.

Furthermore, it is preferable that the actuator the actuator includes a case configured to accommodate the output unit and the worm with the output shaft exposed; the output unit and the worm are movable together in a predetermined direction orthogonal to a rotation axis of the output shaft; the fixing member is in contact with the case; and when the output unit and the worm are moved together in the predetermined direction, the fixing member is slid over the case.

When the output unit and the worm are moved, the fixing member that fixes the worm contacts the case and slide over the case, and this eliminates the displacement of the rotation axis of the worm. As a result, a degradation of the operational accuracy of the rotation of the output shaft can be reduced even though the output unit is moved.

Furthermore, a lamp of the present invention includes: the actuator; and a lamp unit having a light source, the lamp unit being connected to the output shaft of the actuator.

The operational accuracy of the output shaft of the actuator connected to the lamp unit is excellent as described above, and this improves the stability of the operation of the lamp unit.

DESCRIPTION OF EMBODIMENTS

In the following, a preferred embodiment of a fixing member, a self-aligning bearing mechanism, an actuator, and a lamp according to the present invention will be described in detail with reference to the drawings.

Figure 1:
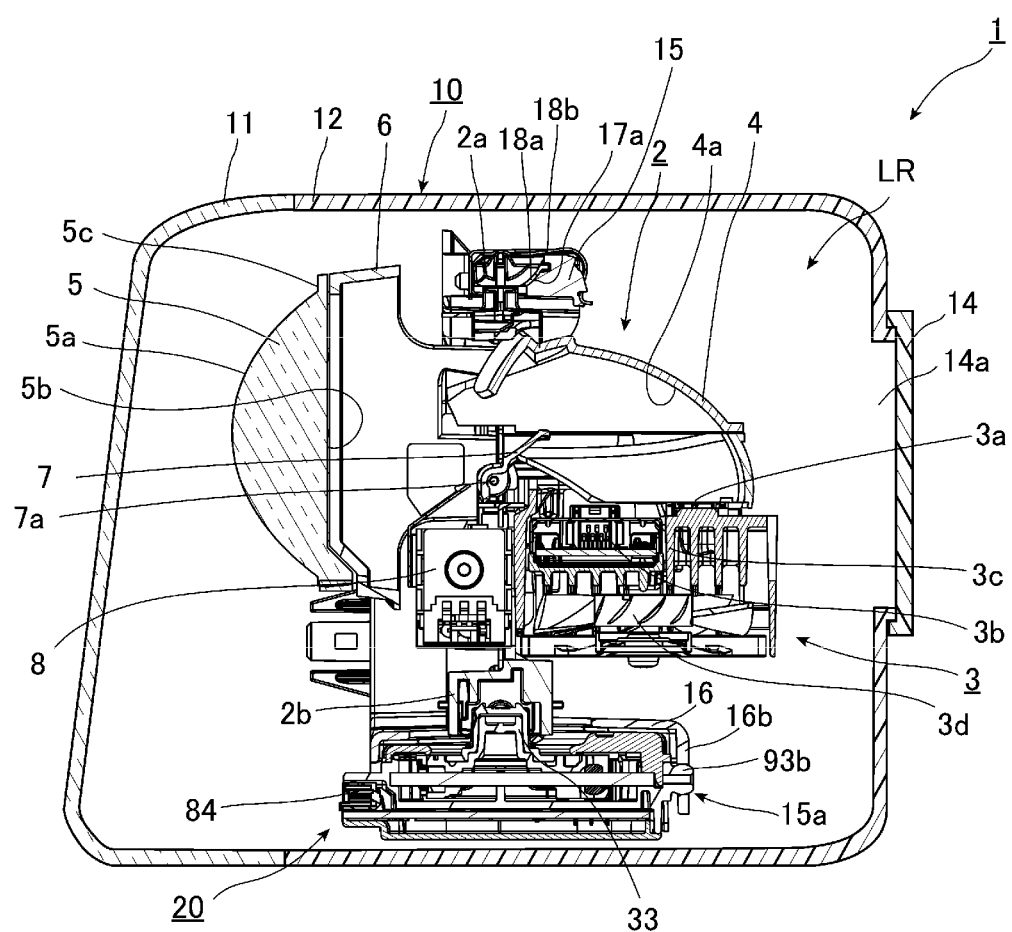
FIG. 1 is a schematic cross sectional view of a lamp according to an embodiment of the present invention.
Figure 2:
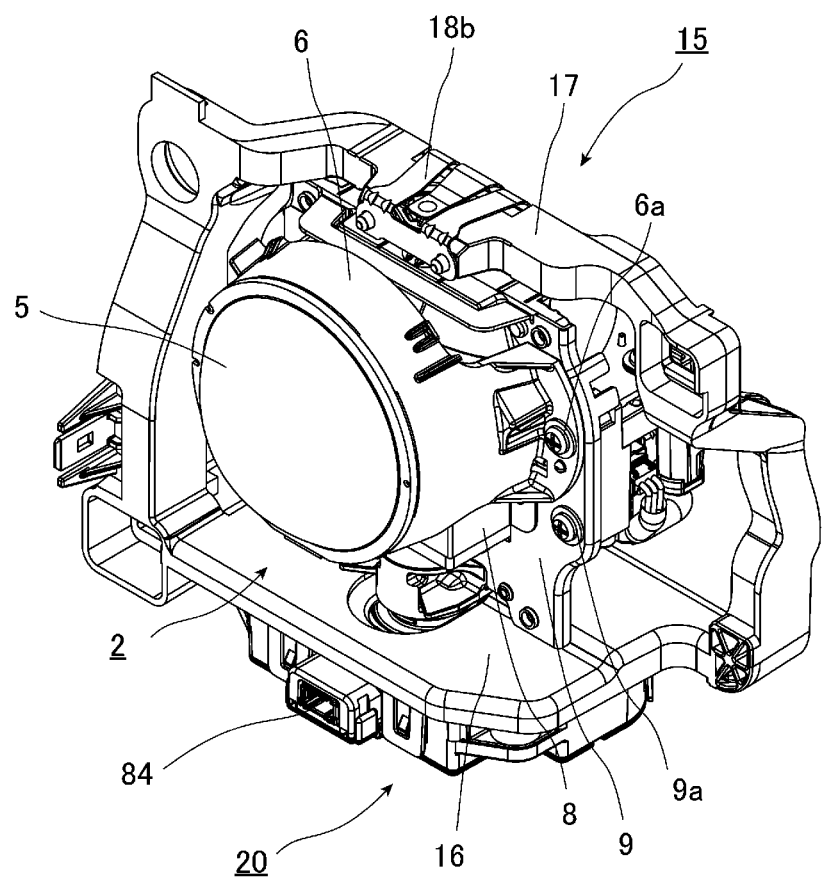
FIG. 2 is a perspective view of a lamp unit, an actuator, and a bracket in the lamp illustrated in FIG. 1.
Figure 3:
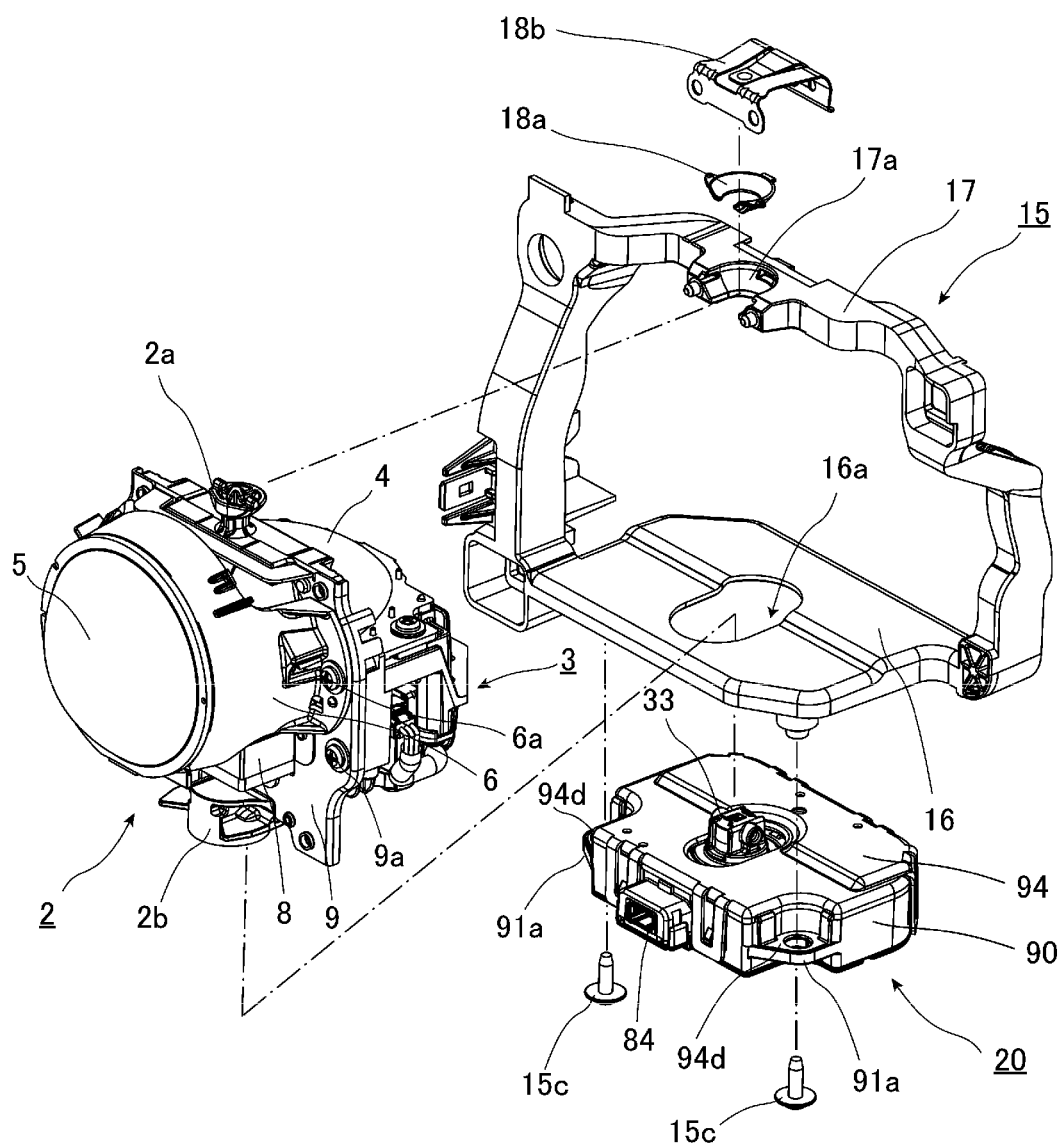
FIG. 3 is an exploded perspective view of the lamp unit, the actuator, and the bracket illustrated in FIG. 2.

FIG. 1 is a schematic cross sectional view of a lamp according to an embodiment of the present invention. FIG. 2 is a perspective view of a lamp unit, an actuator, and a bracket in the lamp illustrated in FIG. 1. FIG. 3 is an exploded perspective view of the lamp unit, the actuator, and the bracket illustrated in FIG. 2. Note that, in FIGS. to 3 and other drawings below, reference signs are sometimes omitted in order not to complicate drawings.

A lamp 1 according to the embodiment is a vehicle headlight. As illustrated in FIG. 1, the lamp 1 includes a lamp unit 2, an actuator 20, a bracket 15, and a case 10 as main components. In the following description, for convenience of explanation, the side where the light beam emitted from the lamp unit 2 is emitted is sometimes referred to as the "front side", and the opposite side is sometimes referred to as the "rear side".

<Case 10>

The case 10 includes a front cover 11, a lamp housing 12, and a back cover 14. The space on the inner side of the case 10 is a lamp room LR. The lamp unit 2, the bracket 15, and the actuator 20 are accommodated in the lamp room LR.

The front side of the lamp housing 12 is opened. The front cover 11 is fixed to the lamp housing 12 so as to block the opening. The front cover 11 is configured of a material that transmits visible light. On the rear side of the lamp housing 12, an opening 14a smaller than the front opening is formed. The back cover 14 is attached to the lamp housing 12 so as to block the opening 14a.

<Lamp Unit 2>

The lamp unit 2 includes a light source unit 3, a reflector 4, a projection lens 5, a lens holder 6, a shade 7, a solenoid 8, and a base plate 9 as main components.

The light source unit 3 includes a visible light emitting diode $3a$, a light emission controller $3b$, a heat sink $3c$, and a cooling fan $3d$ as main components. In the light source unit 3 according to the embodiment, the visible light emitting diode $3a$ is a semiconductor light emitting diode. The visible light emitting diode $3a$ emits a light beam having a wavelength of approximately 380 nm to 780 nm. Examples of semiconductor light emitting diodes used for the visible light emitting diode $3a$ can include a light emitting diode (LED), a laser diode (LD), and an organic light-emitting diode (OLED). The light emission controller $3b$ controls the light emission of the visible light emitting diode $3a$. Note that, the visible light emitting diode $3a$ may be a light emitting diode other than semiconductor light emitting diodes. However, from the viewpoint of low power and low heat generation, for example, the visible light emitting diode $3a$ is preferably semiconductor light emitting diodes as described above.

On one face side of the heat sink $3c$, the visible light emitting diode $3a$ and the light emission controller $3b$ are mounted through a wiring board, for example. On the other face side of the heat sink $3c$, a heat dissipating fin is integrally provided. On the side where the heat dissipating fin is provided on the heat sink $3c$, the cooling fan $3d$ is mounted. Heat emitted from the visible light emitting diode $3a$ and the light emission controller $3b$ is conducted to the heat sink $3c$. The heat sink $3c$ is cooled by the cooling fan $3d$, and then heat is efficiently emitted from the light source unit 3.

The reflector 4 is formed of a curved plate member. The reflector 4 is fixed to the light source unit 3 so as to cover the visible light emitting diode $3a$. The face of the reflector 4 opposed to the visible light emitting diode $3a$ is a reflection plane $4a$. Specifically, the reflection plane $4a$ mainly has a spheroidal face. The visible light emitting diode $3a$ is placed at the position of the first focal point or the position near the first focal point in the first focal point and the second focal point of the elliptic surface. At least a part of a light beam emitted from the visible light emitting diode $3a$ is reflected off the reflection plane $4a$ to the projection lens 5 side.

The projection lens 5 is an aspherical planoconvex lens. An incidence plane $5b$ that is a face to which the light beam emitted from the visible light emitting diode $3a$ is entered is a flat face. A light emitting face $5a$ that is a face from which the light beam is emitted is a convex face bulging in the emitting direction of the light beam. On the outer rim of the projection lens 5, a flange $5c$ is formed. The projection lens 5 is placed in such a manner that its back focal point is located at or near the second focal point of the reflection plane $4a$ of the reflector 4. That is, the lamp unit 2 according to the embodiment is a projector ellipsoid system (PES).

The lens holder 6 is a member that holds the projection lens 5. The projection lens 5 is fixed to the lens holder 6 by welding the flange 5c to one end of the lens holder 6. The end portion of the lens holder 6 on the opposite side of the projection lens 5 side is fixed to the light source unit 3 using a screw 6a, for example.

The base plate 9 is a plate-like member, and fixed to the light source unit 3 between the lens holder 6 and the light source unit 3 using a screw 9a, for example. The base plate 9 is formed with an opening. A light beam emitted from the visible light emitting diode 3a and reflected off the reflector 4 is passed through the opening. A light beam emitted from the visible light emitting diode 3a is passed through the opening, and entered to the projection lens 5.

On the side where the actuator 20 is placed in the base plate 9, a connection projection 2b is provided to connect the lamp unit 2 to the actuator 20. On the opposite side of the side where the connection projection 2b is provided in the base plate 9, a supported projection 2a is provided to connect the lamp unit 2 to the bracket 15. The supported projection 2a has a curved surface protruding toward the base plate 9 side. The connection projection 2b has a bottomed tubular shape with an opening on the side where the actuator 20 is placed.

The shade 7 is a member that blocks a part of the light beam emitted from the visible light emitting diode 3a. The shade 7 is provided between the projection lens 5 and the visible light emitting diode 3a, and fixed to the base plate 9. The light beam emitted from the visible light emitting diode 3a is reflected off the reflector 4, and a part of the light beam is applied to the shade 7. A part of the light beam applied to the shade 7 is shielded by the shade 7, which is not entered to the projection lens 5. The other part is reflected off the shade 7, and entered to the projection lens 5. Thus, since the shade 7 controls the light beam emitted from the visible light emitting diode 3a and the light beam is entered to the projection lens 5, the light beam emitted from the projection lens 5 has the distribution of a desired light pattern. The shade 7 of the embodiment is configured to be rotatable about a rotation axis 7a, and is rotated with power from the solenoid 8. Since the shade 7 can be moved as described above, the distribution of the light pattern can be changed corresponding to the degree of rotation of the shade 7.

<Bracket 15>

The bracket 15 has a plate-like mounting plate 16 placed between the lamp unit 2 and the actuator 20 and having a face opposed to the lamp unit 2 and a face opposed to the actuator 20, and has a frame-like frame 17 formed continuously to the mounting plate 16 and surrounding the lamp unit 2 when viewed from the front.

The mounting plate 16 has a through hole 16a penetrating from the lamp unit 2 side to the actuator 20 side. The connection projection 2b of the lamp unit 2 is passed through the through hole 16a. The through hole 16a has the width that accepts the connection projection 2b and has a predetermined length in a front-back direction so that the connection projection 2b is movable in the front-back direction. As illustrated in FIG. 1, the mounting plate 16 has a support piece 16b extending from the rear end to the side where the actuator 20 is placed. The support piece 16b is formed with a through hole 15a penetrating in the thickness direction. The through hole 15a is used for mounting the actuator 20 on the bracket 15.

On the frame 17, a groove 17a having a curved surface corresponding to the curved surface of the supported projection 2a is formed at the position opposed to the through hole 16a. The supported projection 2a is fit to the groove 17a through a sliding member 18a in a shape corresponding to the curved surface of the supported projection 2a and the curved surface of the groove 17a. The lamp unit 2 is connected to the bracket 15 by fixing a holding member 18b to the frame 17 so as to cover the supported projection 2a. The lamp unit 2 is supported on the bracket 15 in such a manner that the lamp unit 2 is rotatable about the rotation axis on the straight line connecting the supported projection 2a to the connection projection 2b in a predetermined range and the lamp unit 2 is movable as a pendulum in the front-back direction orthogonal to the rotation axis in a predetermined range.

<Actuator 20>

Figure 4:
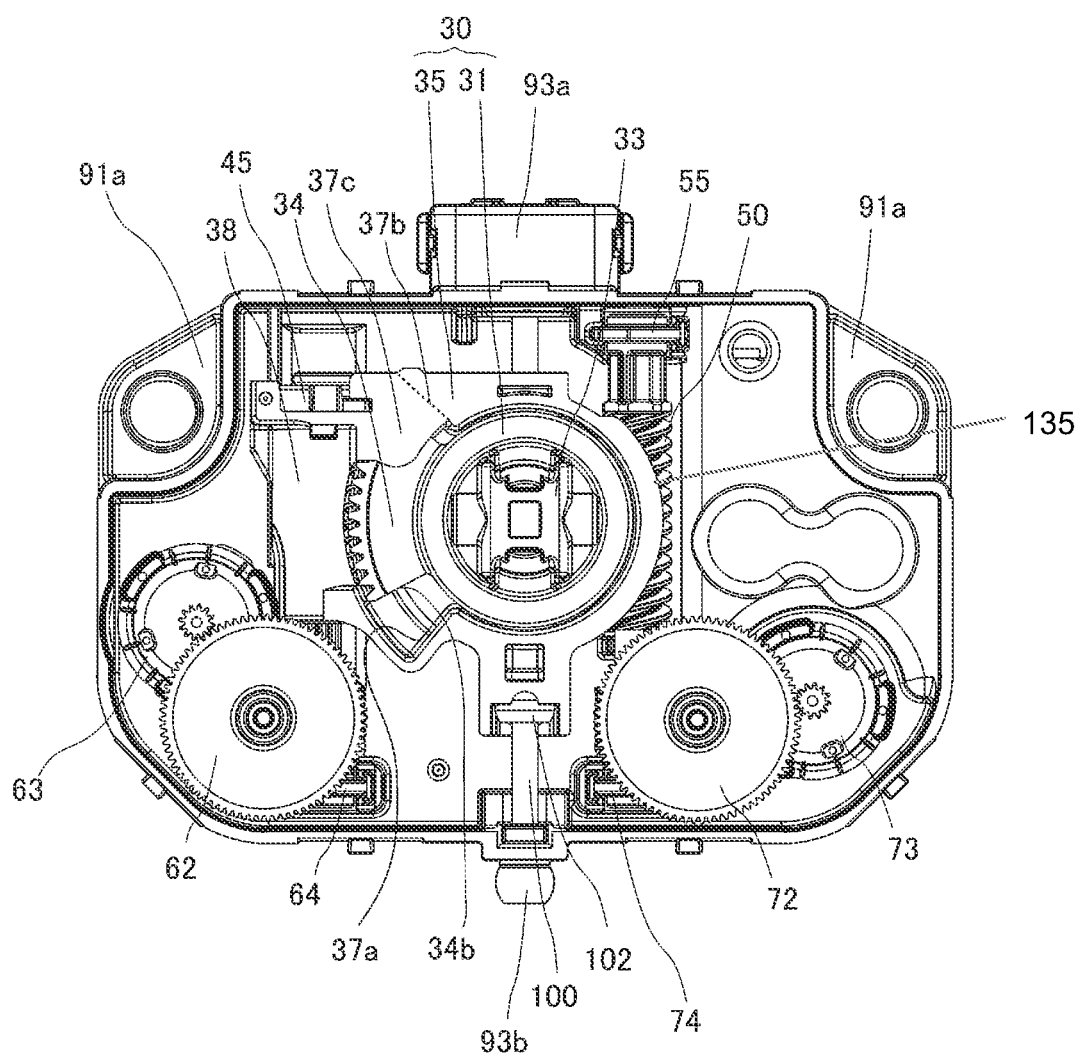
FIG. 4 is a plan view of the actuator according to the embodiment with a first lid member omitted.
Figure 5:
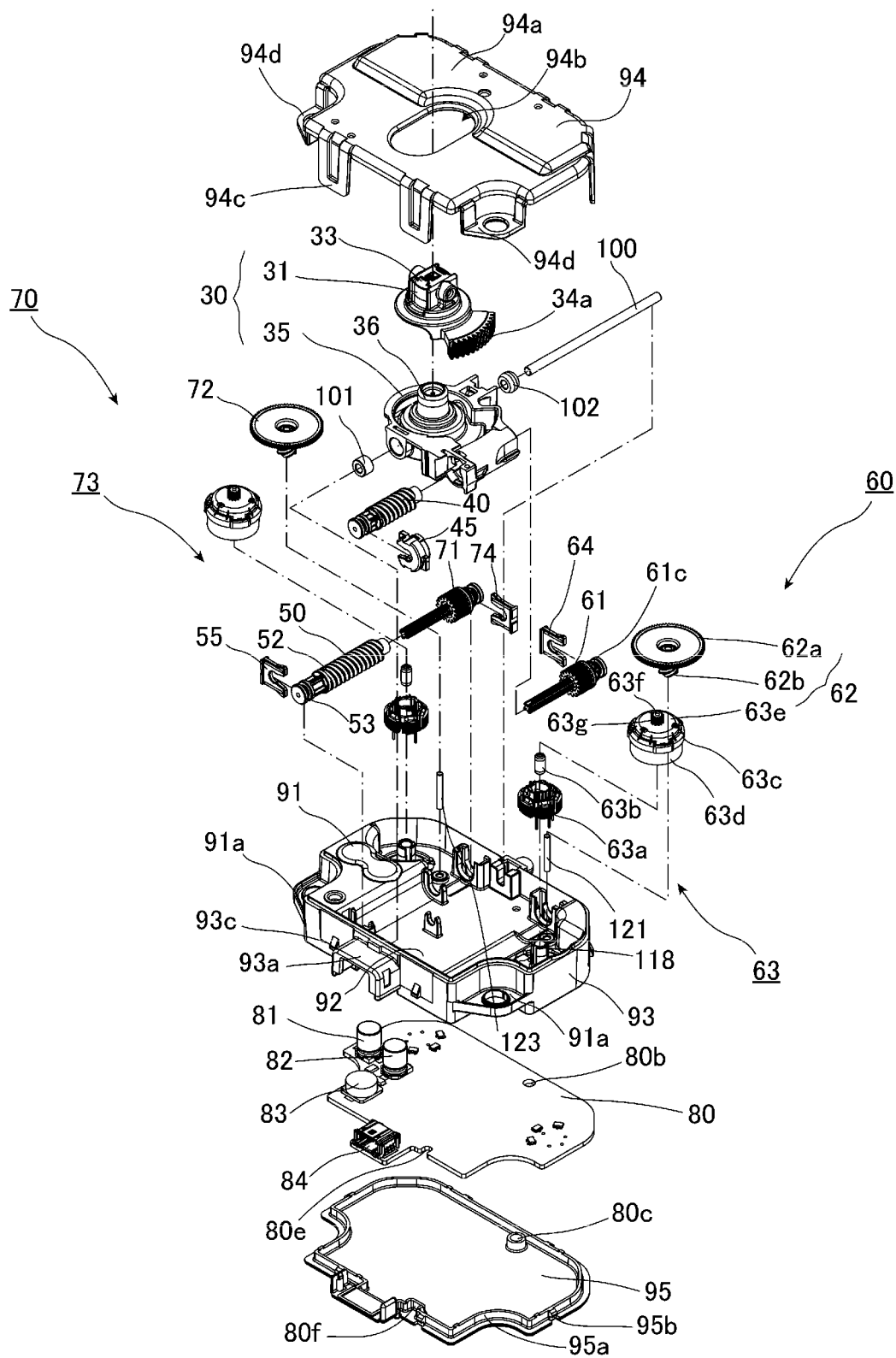
FIG. 5 is an exploded perspective view of the actuator according to the embodiment.
Figure 6:
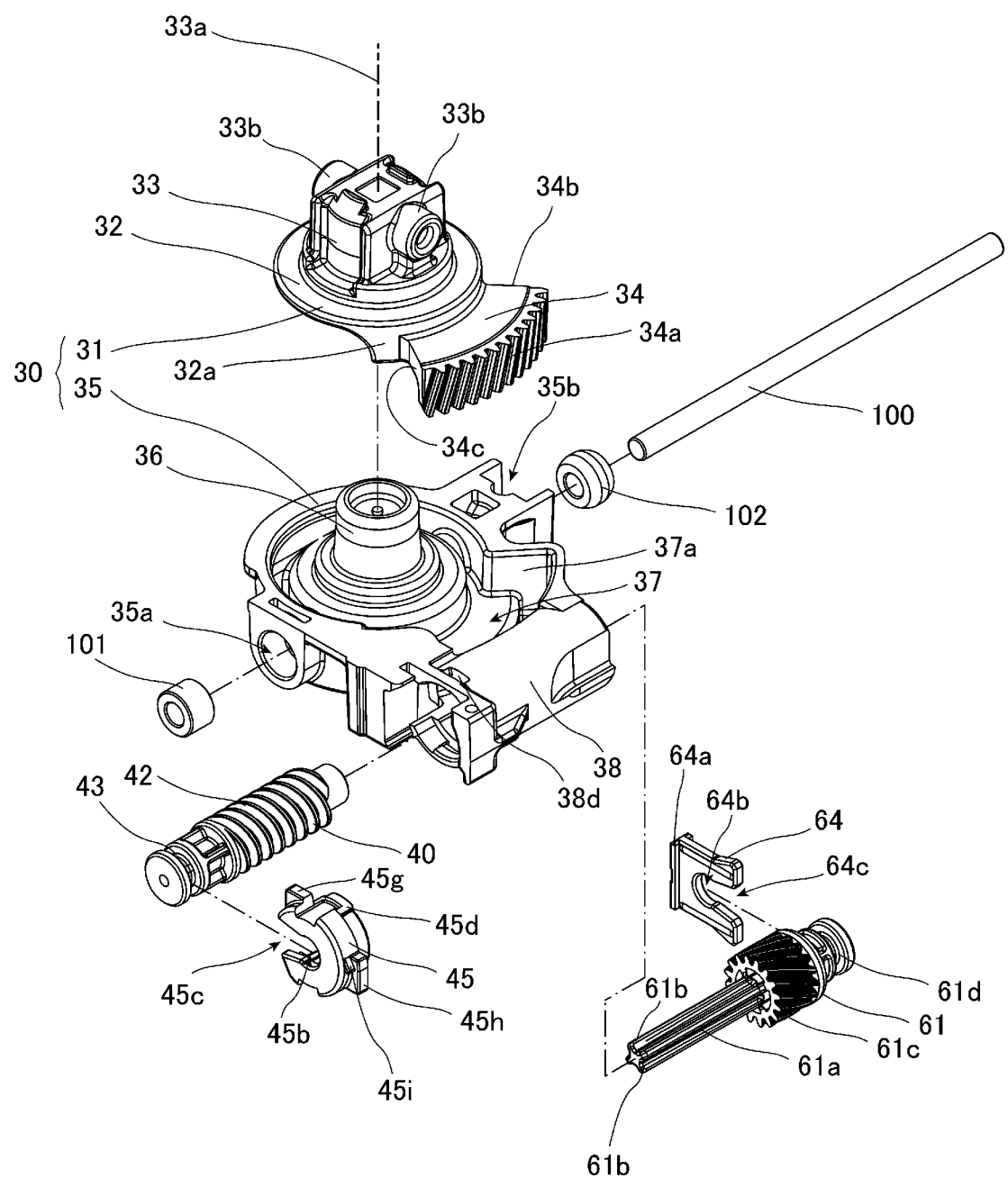
FIG. 6 is an exploded perspective view of some members, which are enlarged, in the members illustrated in FIG. 5.
Figure 7:
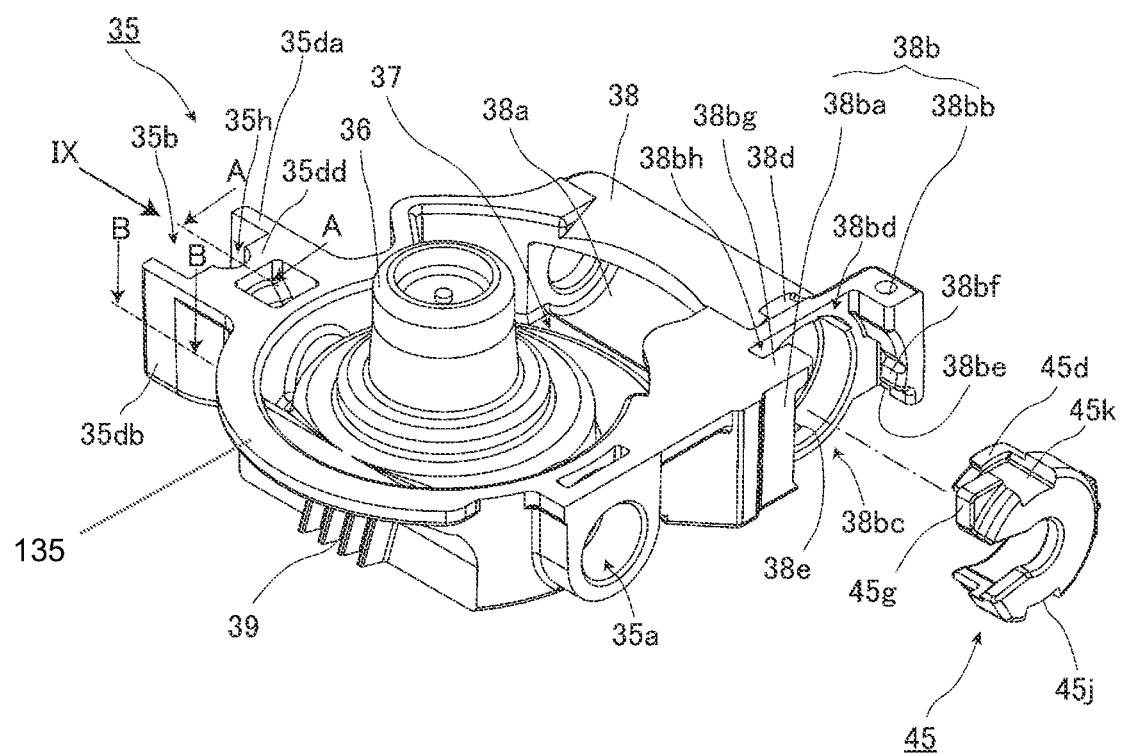
FIG. 7 is an exploded perspective view of an accommodating member and a fixing member alone.
Figure 8:
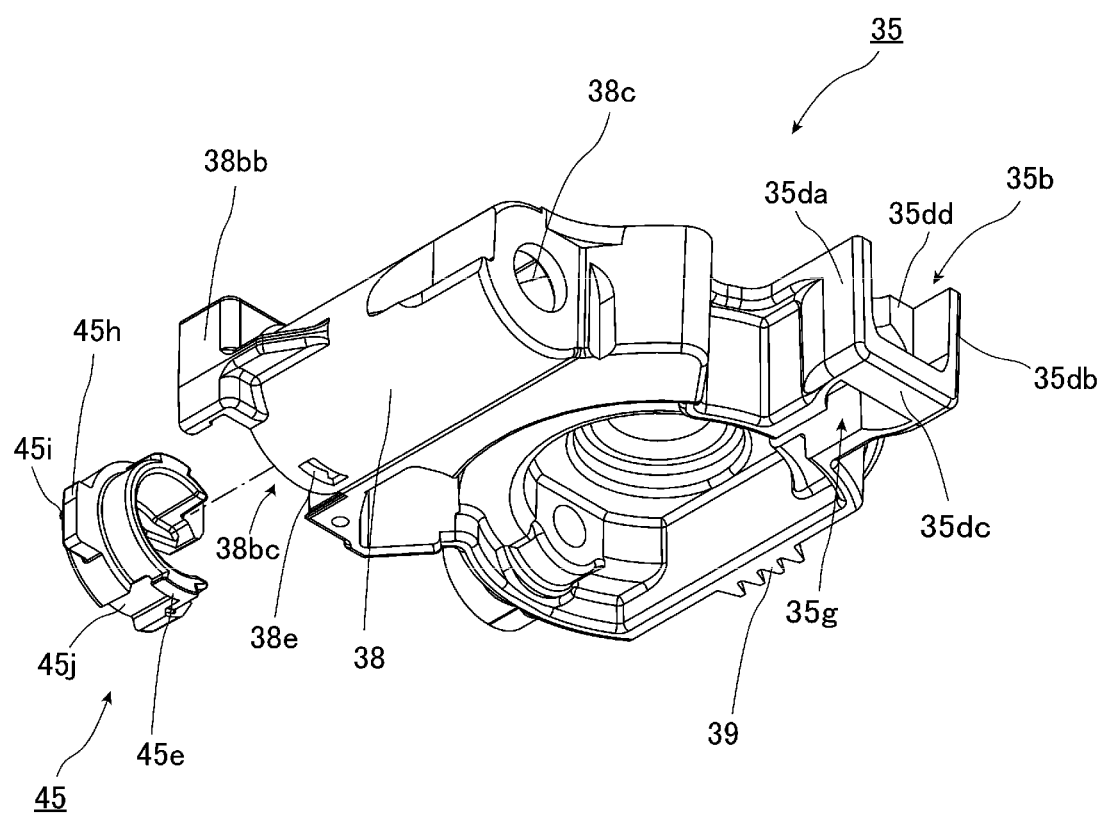
FIG. 8 is an exploded perspective view of the accommodating member and the fixing member alone seen from a direction different from the direction in FIG. 7.

FIG. 4 is a plan view of the actuator 20 from which a first lid member 94, described later, is omitted. FIG. 5 is an exploded perspective view of the actuator 20. FIG. 6 is an exploded perspective view of some members, which are enlarged, in the members illustrated in FIG. 5. FIG. 7 is an exploded perspective view of an accommodating member 35 and a fixing member 45 alone. FIG. 8 is an exploded perspective view of the accommodating member 35 and the fixing member 45 alone seen from a direction different from the direction in FIG. 7.

The actuator 20 includes an output unit 30 having an output shaft 33, a first worm 40 and a second worm 50 extending along a face perpendicular to the output shaft 33, a first driving mechanism 60 that transmits driving force to the first worm 40, a second driving mechanism 70 that transmits driving force to the second worm 50, a circuit board 80, and a case 90 that accommodates these components as main components.

(Output Unit 30)

The output unit 30 includes an output shaft member 31 and an accommodating member 35 overlapped with the output shaft member 31.

As illustrated in FIG. 6, the output shaft member 31 has a disc-like base 32, an output shaft 33 protruding from the center of the base 32 to one face side, a drooping piece 32a extending from a part of the outer edge of the base 32 to the opposite side of the output shaft 33 that protrudes, and a gear part 34 provided to protrude from the drooping piece 32a to the outer side in parallel with the radial direction of the base 32.

The gear part 34 has the outer edge formed in an arc shape, and has a helical gear 34a at the outer edge. The helical gear 34a functions as a rotating mechanism that is meshed with the first worm 40 to rotate the output shaft 33 about a predetermined rotation axis 33a. The helical gear 34a is a helical gear formed on a face along the arc having the rotation axis 33a as the center.

The output shaft 33 is a part connected to the connection projection 2b of the lamp unit 2. The output shaft 33 is a part having a bottomed tubular shape with a hollow portion opened to the base 32 side. The output shaft 33 has a pair of joining projections 33b protruding from the outer circumferential surface to the outer side. The pair of joining projections 33b is formed on a straight line orthogonal to the rotation axis 33a. The output shaft 33 is inserted into the hollow portion of the connection projection 2b. Each of the pair of joining projections 33b is engaged with a recess, not shown, on the inner circumferential surface of the connection projection 2b. The output shaft 33 is thus connected to the connection projection 2b, and the lamp unit 2 is rotated or moved following the output shaft 33.

As illustrated in FIG. 7, the accommodating member 35 has an insertion projection 36, a gear accommodating part 37, a worm accommodating part 38 provided adjacent to the gear accommodating part 37, and a helical gear rack 39 formed on the outer side on the opposite side of the side where the gear accommodating part 37 is provided on the insertion projection 36.

The insertion projection 36 is a part inserted into the hollow portion of the output shaft 33. The insertion projection 36 has a nearly tubular shape with its outer diameter slightly smaller than the inner diameter of the hollow portion of the output shaft 33. The insertion projection 36 is inserted into the hollow portion of the output shaft 33, and the output shaft 33 is rotatable about the rotation axis 33a relatively to the accommodating member 35. However, the relative movement to the accommodating member 35 in the direction orthogonal to the rotation axis 33a is regulated. That is, the output shaft 33 is rotatable about the rotation axis 33a relatively to the accommodating member 35, but the output shaft 33 is also moved together when the accommodating member 35 is moved in the direction orthogonal to the rotation axis 33a.

The gear accommodating part 37 has an opening on the side where the output shaft member 31 is overlapped with, and the gear accommodating part 37 is a recess in which the gear part 34 is accommodated. The gear part 34 is accommodated from the opening into the gear accommodating part 37. The gear accommodating part 37 has bumping walls 37a and 37b formed apart from each other in the rotation direction of the output shaft 33. The bumping wall 37a is shown in FIGS. 4 and 6. The position at which the bumping wall 37b is formed is indicated by a dotted line in FIG. 4. The bumping walls 37a and 37b are formed in the orientation opposed to end faces 34b and 34c of the gear part 34 in the rotation direction of the output shaft 33. The output shaft 33 can be rotated about the rotation axis 33a relatively to the accommodating member 35 in the range from the position at which the one end face 34b of the gear part 34 bumps the bumping wall 37a in the rotation direction of the output shaft 33 to the position at which the other end face 34c of the gear part 34 bumps the bumping wall 37b in the rotation direction of the output shaft 33. At the end portion on the bumping wall 37b side in the gear accommodating part 37, a lid 37c is formed to block a part of the opening of the gear accommodating part 37. In the planar view, when the gear part 34 is at the position where the gear part 34 is overlapped with the lid 37c, the gear part 34 is prevented from slipping off from the gear accommodating part 37. For example, in the case in which the rotation axis 33a is temporarily rotated to the limit in order to detect the initial position of the rotation axis 33a, the force in the direction to cause the gear part 34 to slip off from the gear accommodating part 37 might work on the gear part 34 when the gear part 34 is strongly pressed against the bumping wall 37b. However, the lid 37c is provided to press the gear part 34 against the gear accommodating part 37 side, and this prevents the gear part 34 from slipping off from the gear accommodating part 37.

The worm accommodating part 38 is a part in which the first worm 40 is accommodated, and formed in a nearly tubular shape. However, as illustrated in FIG. 7, on the side where the gear accommodating part 37 is provided in the worm accommodating part 38, an opening 38a is formed. A part of the first worm 40 accommodated in the worm accommodating part 38 is exposed from the opening 38a to the gear accommodating part 37 side. The first worm 40 is thus exposed to the gear accommodating part 37 side, and this enables the meshing of the first worm 40 with the helical gear 34a.

On the inlet side where the first worm 40 is inserted in the worm accommodating part 38, a through hole 38d illustrated in FIG. 7 and a through hole 38e illustrated in FIG. 8 are formed. The through holes 38d and 38e may be recesses formed on the inner circumferential surface side of the worm accommodating part 38.

As illustrated in FIG. 7, on the inlet side of the worm accommodating part 38, a fixing part 38b is provided so that the fixing member 45 can be placed. The fixing member 45 is a member that fixes the first worm 40 to the accommodating member 35. The fixing part 38b is formed of pieces 38ba and 38bb that are formed continuously to the end portion on the fixing part 38b side of the worm accommodating part 38. The pieces 38ba and 38bb are provided opposed to each other. The pieces 38ba and 38bb are formed to extend from the end portions of the worm accommodating part 38 in the direction in parallel with the longitudinal direction of the worm accommodating part 38. Between one end portions of the pieces 38ba and 38bb, a gap 38bc is formed. Between the other end portions of the pieces 38ba and 38bb, a gap 38bd is formed. At the position on the worm accommodating part 38 side of the piece 38bb, a groove 38be opened to the gap 38bc side is formed. On the opposite side of the groove 38be of the worm accommodating part 38, a projection 38bf protruding on the piece 38ba side is formed. On the piece 38ba, a projection 38bg protruding on the piece 38bb side is formed on the opposite side of the gap 38bd of the worm accommodating part 38. The projection 38bg and the end portion of the worm accommodating part 38 form a notch 38bh.

As illustrated in FIG. 8, on the opposite side of the fixing part 38b of the worm accommodating part 38, an opening 38c is formed. When the first worm 40 is accommodated in the worm accommodating part 38, the end portion of the first worm 40 is exposed from the opening 38c.

As illustrated in FIG. 7, the helical gear rack 39 is a helical gear rack formed on the face opposed to the second worm 50 in the output unit 30, and meshed with the second worm 50. More specifically, in the accommodating member 35, the helical gear rack 39 is formed on the face in parallel with the longitudinal direction of the second worm 50 as opposed to the second worm 50. The helical gear rack 39 is meshed with the second worm 50, and this enables the movement of the output unit 30 in the direction orthogonal to the rotation axis 33a corresponding to the rotation on the second worm 50. That is, the helical gear rack 39 functions as a moving mechanism that is meshed with the second worm 50 to move the output shaft 33 in the direction orthogonal to the rotation axis 33a. As shown in FIG. 7, the accommodating member 35 includes a flange 135 that extends in a direction orthogonal to the rotation axis and overlaps the entire helical gear rack 39 in a direction parallel to the rotation axis.

In the actuator 20 according to the embodiment, the helical gear rack 39 is formed on the shortest line connecting the output shaft 33 to the second worm 50. The helical gear rack 39 that functions as a moving mechanism is formed on the shortest line connecting the output shaft 33 to the second worm 50. Thus, the distance between the point of action at which the second worm 50 is meshed with the helical gear rack 39 and the output shaft 33 becomes short, and this facilitates appropriate conduction of the force from the second worm 50 to the output shaft 33.

In order to achieve the smooth movement of the output shaft 33 in the direction orthogonal to the rotation axis 33a as described above, the accommodating member 35 is moved by the guide of a bar-like guide shaft 100 placed in such a manner that the longitudinal direction of the guide shaft 100 is directed to the direction orthogonal to the rotation axis 33a. The accommodating member 35 has bearing accommodating parts 35a and 35b in which the bearing of the guide shaft 100 is placed. The bearing accommodating parts 35a and 35b are provided apart from each other in the moving direction of the accommodating member 35, i.e. in the longitudinal direction of the guide shaft 100.

On the bearing accommodating part 35a, a bearing 101 that is the bearing of the guide shaft 100 is placed. The outer diameter of the bearing 101 is almost the same as the inner diameter of the bearing accommodating part 35a. The bearing 101 is fixed to the bearing accommodating part 35a by press fitting, for example.

Figure 9:
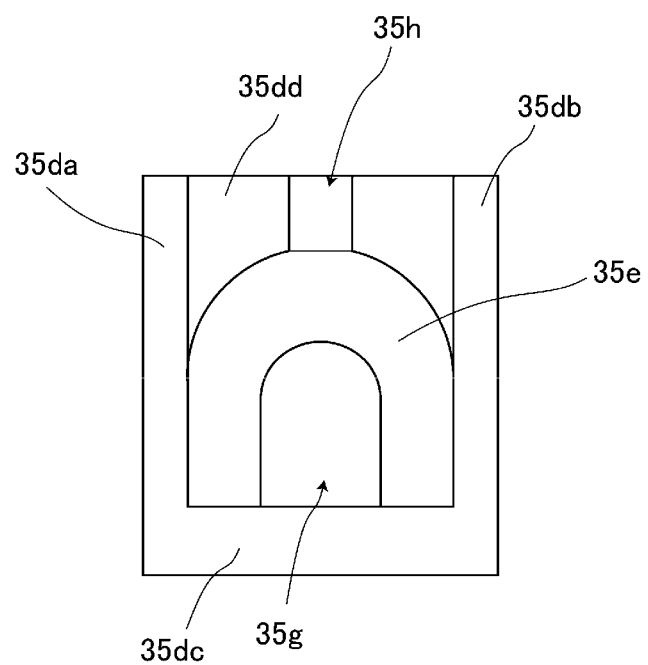
FIG. 9 is a schematic diagram of a bearing accommodating part seen from the direction indicated by arrow IX in FIG. 7.
Figure 10A:
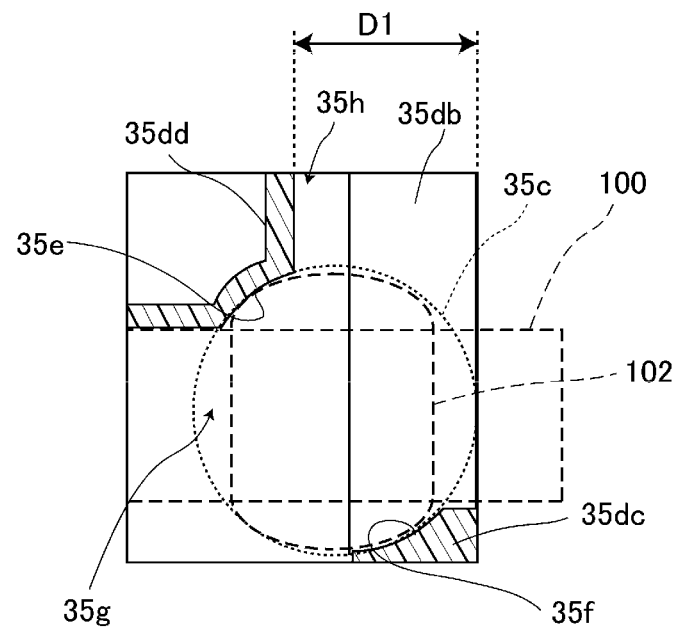
FIG. 10A is a diagram illustrating the use of the bearing and a guide shaft depicted by broken lines in the schematic diagram of a cross section indicated by arrows A in FIG. 7.
Figure 10B:
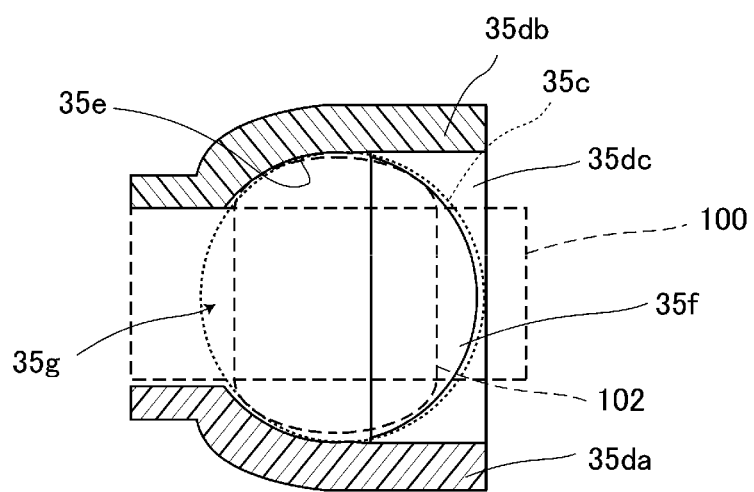
FIG. 10B is a diagram illustrating the use of the bearing and the guide shaft depicted by broken lines in the schematic diagram of a cross section indicated by arrows B in FIG. 7.

On the bearing accommodating part 35b, a bearing 102 that is the bearing of the guide shaft 100 is placed. Here, referring to FIGS. 7 to 10B, the bearing accommodating part 35b will be described. FIG. 9 is a schematic diagram of the bearing accommodating part 35b seen from the direction indicated by arrow IX in FIG. 7. FIG. 10A is a diagram of the bearing 102 and the guide shaft 100 depicted by broken lines when the bearing 102 is used in a schematic diagram of a cross section indicated by arrows A in FIG. 7. FIG. 10B is a diagram of the bearing 102 and the guide shaft 100 depicted by broken lines when the bearing 102 is used in a schematic diagram of a cross section indicated by arrows B in FIG. 7. Note that, the phrase "when the bearing 102 is used" means the state in which the guide shaft 100 is inserted into the bearing 101 and the bearing 102 and the accommodating member 35 is movable along the guide shaft 100.

The bearing accommodating part 35b has a pair of pieces 35da and 35db opposed to each other, a piece 35dc connecting one end portions of the pieces 35da and 35db to each other, and a piece 35dd connecting the other end portions of the pieces 35da and 35db to each other.

The inner faces of the pieces 35da, 35db, and 35dd form a curved inner wall 35e in a shape protruding on the bearing accommodating part 35a side and having a concave wall surface. On the inner face of the piece 35dc, a concave portion 35f with a curved surface is formed. The inner wall 35e and the concave portion 35f have a curved surface corresponding to the outer circumferential surface of the bearing 102. As illustrated in FIGS. 10A and 10B, when the bearing 102 is used, the inner wall 35e and the concave portion 35f contact the bearing 102. As described above, when the bearing 102 is used, the bearing 102 is held in a bearing holding space 35c surrounded by the inner wall 35e and the concave portion 35f. When the bearing 102 is used, the inner wall 35e contacts one side of the guide shaft 100 in the longitudinal direction in the outer circumferential surface of the bearing 102, and the concave portion 35f contacts the other side. Thus, the movement of the bearing 102 in the longitudinal direction of the guide shaft 100 is regulated. The inner wall 35e and the concave portion 35f are formed in a the curved surface corresponding to the outer circumferential surface of the bearing 102, and this enables the rotation of the bearing 102 in the bearing holding space 35c.

On the bearing accommodating part 35a side in the inner wall 35e, an opening 35g is formed. The guide shaft 100 is passed through the opening 35g.

On the inlet side of the bearing accommodating part 35b from which the bearing 102 is inserted as illustrated in FIG. 7 in detail, the inlet side end portion of the piece 35dd is opened between the pieces 35da and 35dd. On the inlet side end portion of the piece 35dd, a groove 35h is formed.

When the bearing accommodating part 35b is seen from the inlet side from which the bearing 102 is inserted, the distance between the pieces 35da and 35db opposed to each other is greater than the outer diameter of the bearing 102. On the other hand, similarly when the bearing accommodating part 35b is seen from the inlet side from which the bearing 102 is inserted, the distance between the pieces 35dc and 35dd is smaller than the outer diameter of the bearing 102.

Figure 11A:
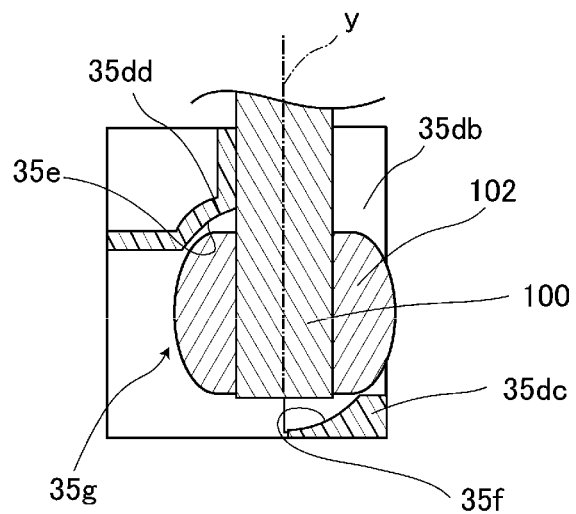
FIGS. 11A to 11D are schematic diagrams illustrating the arrangement process of the bearing.
Figure 11B:
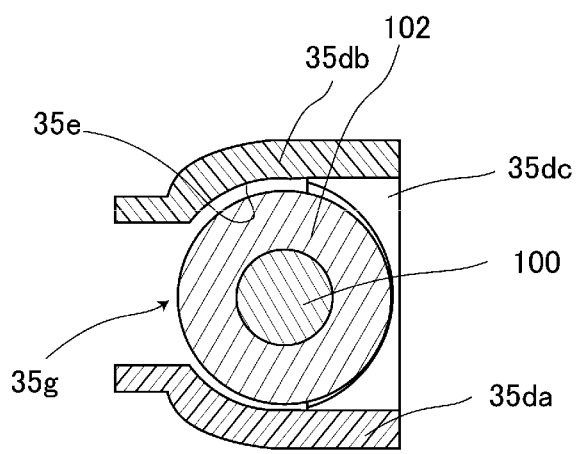
Figure 11C:
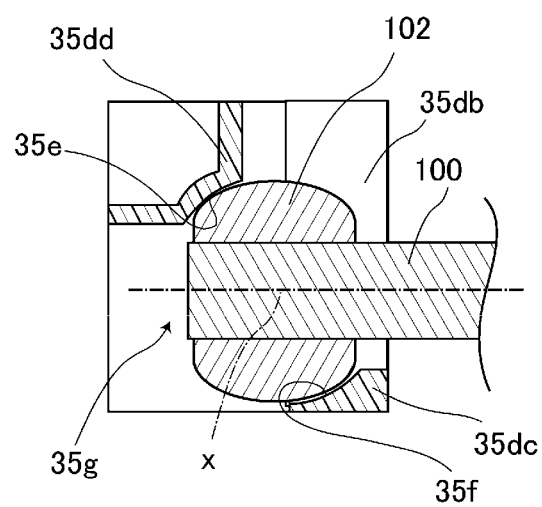
Figure 11D:
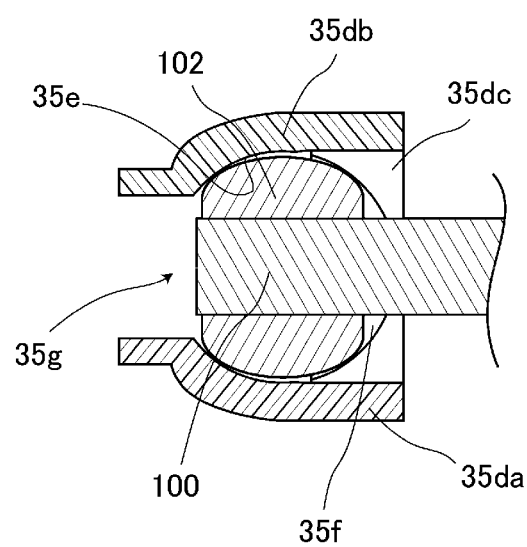

Next, a method of placing the bearing 102 on the bearing accommodating part 35b thus formed will be described with reference to FIGS. 11A to 11D. FIGS. 11A to 11D are diagrams illustrating the arrangement process of the bearing 102. FIGS. 11A and 11B illustrate the bearing holding space 35c before the bearing 102 is placed on the bearing holding space 35c. FIGS. 11C and 11D illustrate the bearing holding space 35c when the bearing 102 is placed on the bearing holding space 35c. FIGS. 11A and 11C are diagrams of the same place as FIG. 10A. FIGS. 11B and 11D are diagrams of the same place as FIG. 10B.

As described above, on the inlet side of the bearing accommodating part 35b from which the bearing 102 is inserted, the distance between the pieces 35da and 35db is greater than the outer diameter of the bearing 102, and the distance between the pieces 35dc and 35dd is smaller than the outer diameter of the bearing 102. Thus, the bearing 102 fails to be passed through the bearing holding space 35c unless the bearing 102 is directed to a predetermined orientation. This predetermined orientation is the orientation different from the orientation when the bearing 102 is used.

Here, the longitudinal direction of the guide shaft 100 to be inserted into the bearing 102 when the bearing 102 is insertable into the bearing holding space 35c is defined as a first axial direction y that is depicted by an alternate long and short dash line in FIG. 11A. The longitudinal direction of the guide shaft 100 to be inserted into the bearing 102 when the bearing 102 is used is defined as a second axial direction x that is depicted by an alternate long and short dash line in FIG. 11C. The first and the second axial directions y and x are directions intersecting with each other.

As illustrated in FIGS. 11A and 11B, first, the longitudinal direction of the guide shaft 100 to be inserted into the bearing 102 is directed to the first axial direction y, and the bearing 102 is inserted from the outside toward the bearing holding space 35c. In the embodiment, the first axial direction y is in parallel with the rotation axis 33a, and the moving direction of the bearing 102 when the bearing 102 is insertable into the bearing holding space 35c is the direction orthogonal to the first axial direction y. However, the moving direction of the bearing 102 when the bearing 102 is insertable into the bearing holding space 35c only has to be a direction intersecting with the first axial direction y. As illustrated in FIGS. 11C and 11D, after the bearing 102 reaches the bearing holding space 35c, the bearing 102 is rotated in such a manner that the longitudinal direction of the guide shaft 100 to be inserted into the bearing 102 is turned from the first axial direction y to the second axial direction x. Thus, the bearing 102 can be placed in the bearing holding space 35c.

In the actuator of Patent Literature 1, the output shaft is moved along the guide shaft in order to smoothly move the output shaft. This guide shaft is fixed to the recess provided on the case. However, since the main component of the case is a resin molded product, the position to place the bearing is sometimes displaced due to errors of molds used for preparing components and due to a temperature change, for example, and the improvement of the centering accuracy of the shaft is sought.

In the embodiment, the bearing 102 held in the bearing holding space 35c is rotatable at least in a range in which the longitudinal direction of the guide shaft 100 to be inserted into the bearing 102 is turned from the first axial direction y to the second axial direction x. That is, in accordance with the bearing 102 and the bearing holding space 35c, the bearing 102 can be rotated about the center of the bearing in the bearing holding space 35c. Therefore, even though the direction of the guide shaft 100 to be inserted into the bearing 102 is tilted to the designed orientation more or less, the bearing 102 held in the bearing holding space 35c can follow the tilt of the shaft, and thus the centering of the guide shaft 100 is easily achieved. That is, the bearing 102 and the bearing holding space 35c configure a self-aligning bearing mechanism that can automatically center the guide shaft 100. In accordance with the self-aligning bearing mechanism, even though errors of molds used for preparing members configuring the output unit 30 or a change in the volume of a component due to a temperature change, for example, the guide shaft 100 can be followed to these errors and these changes. The orientation when the bearing 102 is inserted is different from the orientation when the bearing 102 is used, and the movement of the bearing 102 in the center axis direction of the bearing is regulated in the orientation when the bearing 102 is used. Thus, the bearing 102 can be inserted and fixed with no another member to fix the bearing 102, for example.

In the self-aligning bearing mechanism including the bearing 102 and the bearing holding space 35c thus configured, one side along the first axial direction y is preferably opened in the width in which at least the guide shaft 100 to be inserted into the bearing 102 is passed in a section in which the bearing 102 reaches the bearing holding space 35c from the outside, i.e. a section D1 illustrated in FIG. 10A. As described with reference to FIG. 7, in the bearing accommodating part 35b according to the embodiment, an opening is partially formed between the pieces 35da and 35db and the groove 35h is formed on the inlet side. Thus, in the section D1, the one side along the first axial direction y is opened in the width in which the guide shaft 100 is passed. A part of the bearing accommodating part 35b is opened as described above. Therefore, as illustrated in FIGS. 11A and 11D, the bearing 102 can be inserted into the bearing holding space 35c with the guide shaft 100 inserted into the bearing 102, and the bearing 102 can be rotated with the guide shaft 100 inserted into the bearing 102 in such a manner that the center axis of the bearing 102 is turned from the first axial direction y to the second axial direction x in the bearing holding space 35c. Consequently, the bearing 102 can be moved and rotated with the guide shaft 100 in hand, with the guide shaft 100 inserted into the bearing 102, and this facilitates the installation of the bearing 102.

As illustrated in FIGS. 11A and 11D, in the self-aligning bearing mechanism, the outer shape of the bearing 102 is preferably a shape in which the center part has a curved surface protruding higher than two end portions in the longitudinal direction of the guide shaft 100 to be inserted into the bearing 102. The outer shape of the bearing 102 has the curved surface as described above, and this facilitates the rotation of the bearing 102 in the bearing holding space 35c. Since the outer shape of the bearing 102 has a curved surface, the contact area of the inner wall 35e and the concave portion 35f forming the bearing holding space 35c with the bearing 102 is easily increased. Thus, the movement of the bearing 102 is easily regulated.

The first and the second axial directions y and x are preferably orthogonal to each other. Since the orientations of the first and the second axial directions y and x are greatly different as described above, and this easily eliminates the unintentional removal of the bearing 102 from the bearing holding space 35c.

The actuator 20 according to the embodiment includes the output unit 30 having the self-aligning bearing mechanism. The output unit 30 is moved along the guide shaft 100 inserted into the bearing 102. The actuator 20 thus configured uses the self-aligning bearing mechanism having a simple structure as described above. The actuator is an actuator of high operational accuracy and excellent productivity.

(First Worm 40)

As illustrated in FIG. 6, the first worm 40 has a gear 42 on the outer circumference. The first worm 40 is a bar-like rotating member that is rotated about the rotation axis along the longitudinal direction. At one end portion of the first worm 40 in the longitudinal direction, a groove 43 is formed along the circumferential direction. The fixing member 45 that fixes the first worm 40 to the accommodating member 35 is fit to the groove 43. The first worm 40 has a hollow opened at the end portion on the opposite side where the groove 43 is formed. The first worm 40 has the hollow portion, not shown, surrounded by the gear 42 along the rotation axis of the first worm 40.

The fixing member 45 is a fixing member that rotatably fixes the first worm 40 to the accommodating member 35. The accommodating member 35 is a support that supports the first worm 40 through the fixing member 45. The fixing member 45 has a through hole 45b penetrating in the thickness direction, and the outer shape of the fixing member 45 is approximately in a circular shape. However, a part of the fixing member 45 is notched to connect the outer circumferential surface to the inner circumferential surface forming the through hole 45b. The fixing member 45 has elasticity. When the fixing member 45 is fit to the groove 43 of the first worm 40, the notched portion 45c is opened, and the first worm 40 is inserted into the through hole 45b.

The fixing member 45 has an inner circumferential surface to hold the first worm 40 that is rotatable, and an outer circumferential surface provided with a plurality of protrusions. The shape of the outer circumferential surface of the fixing member 45 will be described with reference to FIGS. 7 and 8.

In the fixing member 45, the outer diameter of the portion on the worm accommodating part 38 side is formed narrower than the inner diameter of the worm accommodating part 38. This portion is inserted into the worm accommodating part 38. In the portion of the fixing member to be inserted into the worm accommodating part 38, projections 45d and 45e are formed at the positions opposed to each other on the outer circumferential surface. The projections 45d and 45e are provided at the positions corresponding to the through holes 38d and 38e of the worm accommodating part 38. Note that, on the inner circumferential surface on the inlet side of the worm accommodating part 38, grooves, not shown, are formed so as to guide the projections 45d and 45e to the through holes 38d and 38e. At the portions on the outer circumferential surface of the fixing member 45 that are placed on the fixing part 38b, not inserted into the worm accommodating part 38, two projections 45g and 45h are formed at the positions on the worm accommodating part 38 side. The projection 45g is formed fit to the notch 38bh. The projection 45h is formed fit to the groove 38be. As illustrated in FIG. 6, at the position adjacent to the projection 45h on the opposite side of the worm accommodating part 38, a latch 45i is formed. On the outer circumferential surface of the fixing member 45, recesses 45j and 45k are provided. The recesses 45j and 45k are exposed from the gaps 38bc and 38bd in fixing the fixing member 45 to the accommodating member 35 and when the fixing member 45 stays fixed to the accommodating member 35. The recesses 45j and 45k thus exposed are provided, and this easily rotates the fixing member 45 by applying force to the recesses 45j and 45k. Thus, the fixing member 45 is easily fixed and removed.

In fixing the fixing member 45 to the accommodating member 35, the fixing member 45 is pressed to the worm accommodating part 38 side in such a manner that the projection 45g is located at the gap 38bd and the projection 45h is located at the gap 38bc. After that, the fixing member 45 is rotated to fit the projection 45d to the through hole 38d, the projection 45e to the through hole 38e, the projection 45g to the notch 38bh, the projection 45h to the groove 38be, and the latch 45i to the projection 38bf, and then the fixing member 45 is fixed to the accommodating member 35.

Note that, in FIGS. 7 and 8, the first worm 40 is omitted. The fixing member 45 is inserted into the worm accommodating part 38 together with the first worm 40 with the fixing member 45 fit to the groove 43 of the first worm 40. The fixing member 45 is rotated about the rotation axis of the first worm 40 to fix the fixing member 45 to the accommodating member 35 as described above. After the fixing member 45 is temporarily fixed to the accommodating member 35, the fixing member 45 is fixed to the accommodating member 35 by the force to the extent that the fixing member 45 is not rotated even though the first worm 40 is rotated. As described above, the fixing member 45 is fit to the groove 43 of the first worm 40 as well as fixed to the accommodating member 35, and the fixing member 45 holds the first worm 40 in such a manner that the fixing member 45 regulates the first worm 40 not to be moved in the rotation axis direction.

As described above, the fixing member 45 serves as both the bearing and the antislip-off part of the first worm 40. This first worm 40 and other worms described in detail below have to be highly accurately fixed because these worms have important functions to conduct driving force to the output shaft 33. The fixing member 45 serves as both the bearing and the antislip-off part of the first worm 40, and this easily achieves the highly accurate fixing of the first worm 40 to the accommodating member 35. As described above, the first worm 40 is highly accurately fixed, and thus force is easily appropriately applied from the first worm 40 to the output unit 30. This enables the improvement of the operational accuracy of rotating the output shaft 33. With a form in which the fixing member 45 is rotated about the rotation axis of the first worm 40 in fixing the fixing member 45 to the accommodating member 35, the position of the rotation axis of the first worm 40 is not prone to be displaced in fixing the fixing member 45 to the accommodating member 35, and this enables the more highly accurate fixing of the first worm 40.

(First Driving Mechanism 60) As illustrated in FIG. 5, the first driving mechanism 60 has a shaft member 61, a transmission gear 62, and a motor 63.

As illustrated in FIG. 6, the shaft member 61 is a bar-like rotating member that is rotated about the rotation axis along the longitudinal direction. The shaft member 61 has a shaft part 61a to be inserted into the hollow portion of the first worm 40 described above, a helical gear part 61c provided on the opposite side of the shaft part 61a to be inserted into the first worm 40, and a groove 61d formed on the opposite side of the shaft part 61a of the helical gear part 61c along the circumferential direction. To the groove 61d, a fixing member 64 that fixes the shaft member 61 to the case 90 is fit.

The shaft part 61a has a plurality of protrusions 61b along the longitudinal direction on the outer circumference. The hollow portion of the first worm 40 has grooves along the longitudinal direction. The grooves are engaged with the plurality of protrusions 61b. The shaft part 61a is movable in the hollow portion of the first worm 40 in the longitudinal direction. The shaft member 61 and the first worm 40 are relatively movable in the longitudinal direction. The protrusions 61b of the shaft part 61a are fit to the grooves of the hollow portion of the first worm 40 with the shaft part 61a inserted into the hollow portion of the first worm 40, and thus the relative rotation of the shaft part 61a to the first worm 40 is regulated. Therefore, the shaft member 61 is rotatable about the rotation axis in parallel with the longitudinal direction together with the first worm 40. Thus, the rotation axis of the helical gear part 61c is directed in the same direction as the rotation axis of the first worm 40.

The fixing member 64 is a fixing member that rotatably fixes the shaft member 61 to the case 90 that is a support. The fixing member 64 has a through hole 64b penetrating in the thickness direction, and has approximately a quadrilateral outer shape. However, a part of the fixing member 64 is notched, and the outer circumferential surface is connected to the inner circumferential surface forming the through hole 64b. The fixing member 64 has elasticity. When the fixing member 64 is fit to the groove 61d of the shaft member 61, the notched portion 64c is opened, and the shaft member 61 is inserted into the through hole 64b. The fixing member 64 has an inner circumferential surface that holds the shaft member 61 in such a manner that the shaft member 61 is rotatable, and a protrusion 64a formed along one edge opposed to the portion 64c in the quadrilateral outer shape and protruding in the thickness direction. The fixing member 64 is fixed to the case 90 with the fixing member 64 fit to the groove 61d of the shaft member 61. As described above, the fixing member 64 is fit to the groove 61d of the shaft member 61 as well as fixed to the case 90. Thus, the fixing member 64 holds the shaft member 61 to regulate the movement of the shaft member 61 in the rotation axis direction.

As described above, the fixing member 64 serves as both the bearing and the antislip-off part of the shaft member 61. The fixing member 64 serves as both the bearing and the antislip-off part of the shaft member 61, and this easily achieves the highly accurate fixing of the shaft member 61 to the case 90. As described above, the shaft member 61 is highly accurately fixed, force is easily appropriately applied from the shaft member 61 to the first worm 40, and this enables the improvement of the operational accuracy of the output shaft 33.

As illustrated in FIG. 5, the motor 63 has a core assembly 63a having a coil, a bearing 63b placed in the center of the core assembly 63a, and a rotor member 63c covering the core assembly 63a. The rotor member 63c has a cylindrical magnet 63d placed so as to cover the outer circumference of the core assembly 63a, a lid member 63e placed to cover one end portion of the magnet 63d, and a shaft 63f fixed to the lid member 63e and inserted into the bearing 63b. On the lid member 63e, a spur gear 63g is provided whose rotation axis is matched with the shaft 63f on the opposite side where the core assembly 63a is placed.

The transmission gear 62 has a spur gear 62*a*, a worm 62*b* provided protruding from the center of the spur gear 62*a* to one face side whose rotation axis is directed as matched with rotation axis of the spur gear 62*a*, and a through hole along the rotation axis in the center. The transmission gear 62 is placed in such a manner that the spur gear 62*a* is meshed with the spur gear 63*g* of the rotor member 63*c* and the worm 62*b* is meshed with the helical gear part 61*c* of the shaft member 61.

(Second Worm 50) The second worm 50 is a bar-like rotating member that is rotated about the rotation axis along the longitudinal direction. As illustrated in FIG. 5, the second worm 50 has a gear 52 on the outer circumference. At one end portion of the second worm 50 in the longitudinal direction, a groove 53 is formed along the circumferential direction. To the groove 53, a fixing member 55 that fixes the second worm 50 to the case 90 is fit. The second worm 50 has a hollow portion similarly to the first worm 40.

The fixing member 55 is a fixing member that rotatably fixes the second worm 50 to the case 90 that is a support. The fixing member 55 is configured similarly to the fixing member 64, and the detailed description is omitted. The fixing member 55 serves as both the bearing and the antislip-off part of the second worm 50. The fixing member 55 serves as both the bearing and the antislip-off part of the second worm 50, and this easily achieves the highly accurate fixing of the second worm 50 to the case 90. As described above, the second worm 50 is highly accurately fixed, force is easily appropriately applied from the second worm 50 to the output unit 30, and this enables the improvement of the operational accuracy of the output shaft 33.

(Second Driving Mechanism 70)

As illustrated in FIG. 5, the second driving mechanism 70 has a shaft member 71, a transmission gear 72, and a motor 73.

The shaft member 71 is a bar-like rotating member that is rotated about the rotation axis along the longitudinal direction, and configured similarly to the shaft member 61. The shaft part of the shaft member 71 is inserted into the hollow portion of the second worm 50. The shaft member 71 is rotatable about the rotation axis in parallel with the longitudinal direction together with the second worm 50. The shaft member 71 has a worm part whose rotation axis is directed the same as the rotation axis of the second worm 50. The shaft member 71 is fixed to the case 90 with a fixing member 74.

The fixing member 74 is a fixing member that rotatably fixes the shaft member 71 to the case 90 that is a support. The fixing member 74 is configured similarly to the fixing member 64, and the detailed description is omitted. The fixing member 74 serves as both the bearing and the antislip-off part of the shaft member 71. The fixing member 74 serves as both the bearing and the antislip-off part of the shaft member 71, and this easily achieves the highly accurate fixing of the shaft member 71 to the case 90. As described above, the shaft member 71 is highly accurately fixed, force is easily appropriately applied from the shaft member 71 to the second worm 50, and this enables the improvement of the operational accuracy of the output shaft 33.

The motor 73 is configured similarly to the motor 63. The motor 73 has a core assembly, a bearing, and a rotor member. The rotor member has a spur gear.

The transmission gear 72 is configured similarly to the transmission gear 62, and has a spur gear and a worm. The spur gear is meshed with the spur gear of the motor 73. The worm is meshed with the worm part of the shaft member 71.

(Circuit Board 80)

On the circuit board 80, a circuit in a predetermined pattern, not shown, is formed, and electronic components 81, 82, and 83, a connector 84, and any other components are mounted. The electronic components 81, 82, and 83 are large components in the electronic components placed on the circuit board 80. The electronic components 81, 82, and 83 are radial components, for example. The electronic components 81 and 82 are capacitors, for example. The electronic component 83 is a coil, for example. The connector 84 is placed in the center part on the front side of the circuit board 80.

(Case 90)

Figure 12:
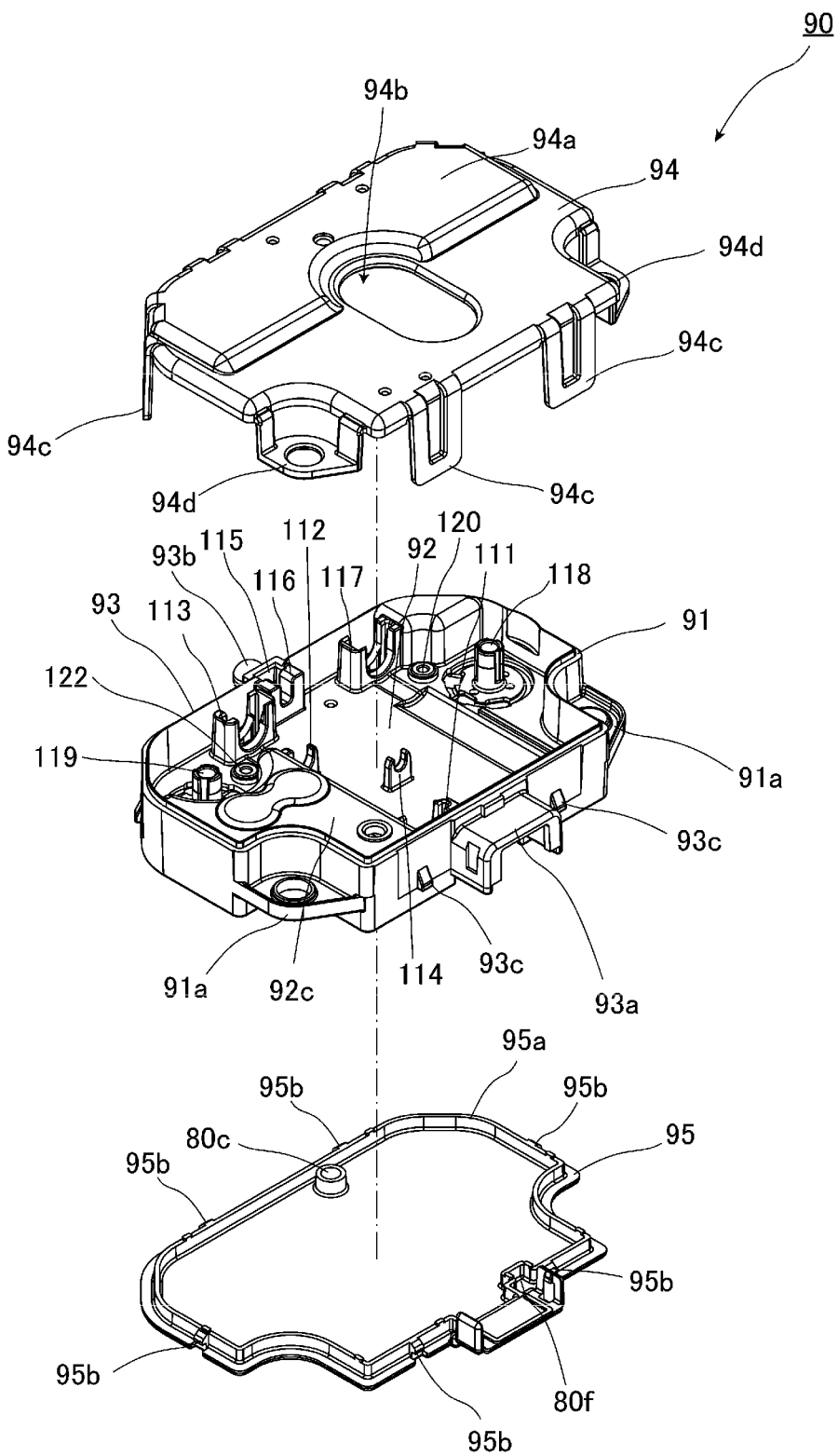
FIG. 12 is an exploded perspective view of a case.
Figure 13:
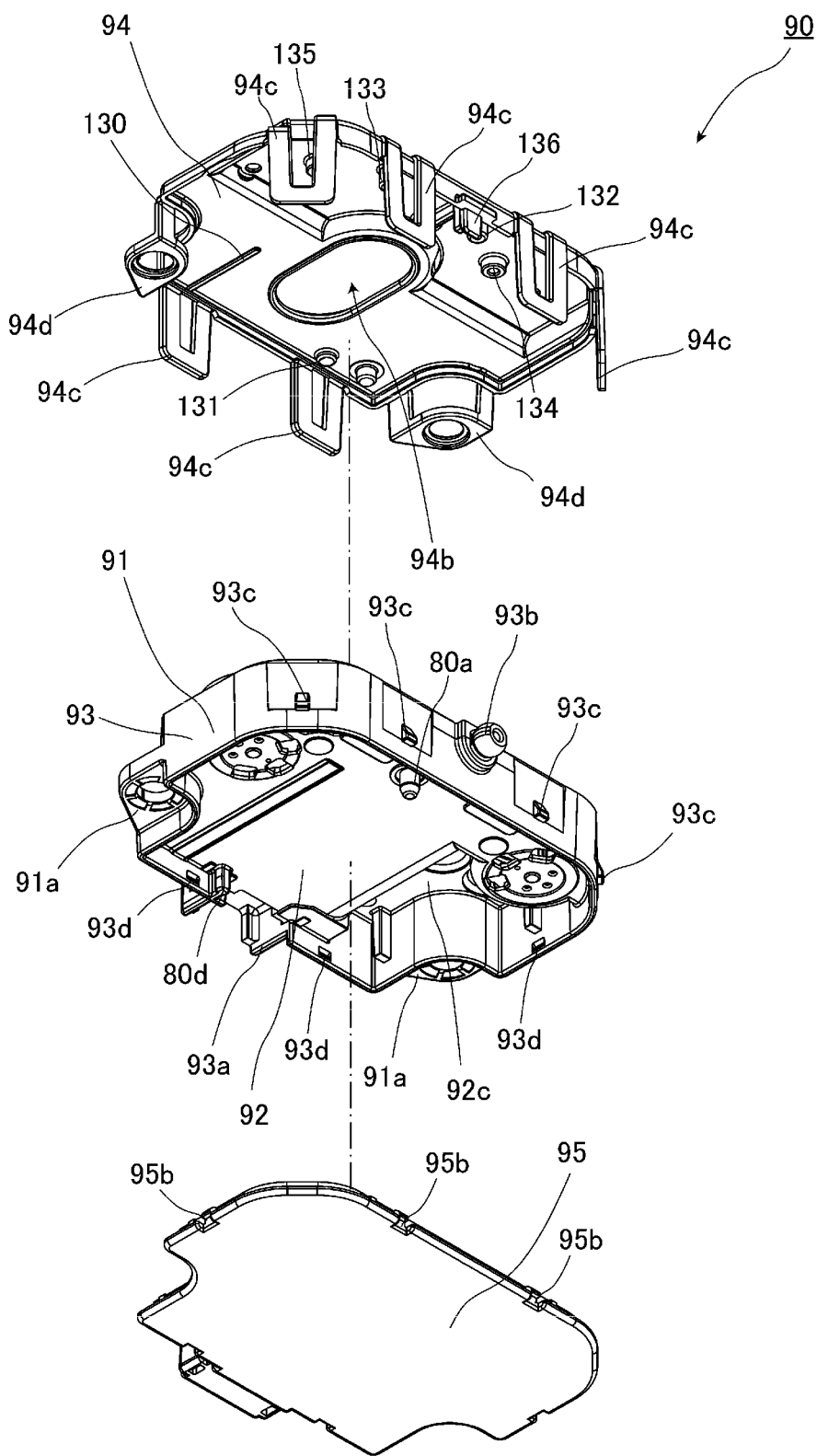
FIG. 13 is an exploded perspective view of the case seen from a direction different from the direction in FIG. 12.

FIG. 12 is an exploded perspective view of the case 90. FIG. 13 is an exploded perspective view of the case 90 seen from a direction different from the direction in FIG. 12. The case 90 includes a case main body 91, a first lid member 94 placed on one side of the case main body 91, and a second lid member 95 placed on the other side of the case main body 91. The case main body 91 has a middle plate 92 and a frame 93 surrounding the outer circumference of the middle plate 92. The frame 93 is provided extending on the first lid member 94 side and the second lid member 95 side of the middle plate 92. The first lid member 94 covers the space formed of one face of the middle plate 92 and the inner circumferential surface of the frame 93. The second lid member 95 covers the space formed of the other face of the middle plate 92 and the inner circumferential surface of the frame 93.

The middle plate 92 has the outer shape having approximately a rectangular plate shape. In a pair of long sides of the rectangle, corners located at two ends of one long side are rounded. Corners located at two ends of the other long side are notched. At a portion near one corner of the notched corners, a projection 92*c* protruding on the first lid member 94 side is formed. In the portion where the projection 92*c* is formed, a gap between the middle plate 92 and the first lid member 94 is narrowed, and a gap between the middle plate 92 and the second lid member 95 is widened.

The frame 93 is formed to surround the outer circumference of the middle plate 92 having the shape described above. At the portions surrounding the notched corners of the middle plate 92 in the frame 93, a pair of mounted pieces 91*a* protruding on the outer side is provided. The pair of mounted pieces 91*a* has a through hole penetrating in the thickness direction. At the position overlapped with the connector 84 in the frame 93, a connector lid 93*a* is provided protruding on the outer side to cover the connector 84. In the frame 93, a barrel-like projection 93*b* in a barrel-like outer shape protruding on the outer side is formed on the opposite side of the connector lid 93*a*. On the outer circumferential surface of the frame 93, on the portions where the mounted piece 91*a*, the connector lid 93*a*, and the barrel-like projection 93*b* are not formed, a plurality of retain projections 93*c* is provided apart from each other in the circumferential direction of the middle plate 92. On the second lid member 95 side of the inner circumferential surface of the frame 93, a plurality of recesses 93*d* is formed apart from each other in the circumferential direction of the middle plate 92.

The first lid member 94 has a plate-like cover main body 94*a* covering most part of one side of the case main body 91. In the planar view when the first lid member 94 is covered over the case main body 91, in the first lid member 94, a plurality of retain pieces 94*c* is provided extending from the outer circumference of the cover main body 94*a*, the plurality of retain pieces 94*c* being overlapped with the frame 93, at the positions overlapped with the plurality of retain projections 93c formed on the frame 93. Each of the plurality of retain pieces 94c has a hole. The retain projections 93c are retained on the holes of the retain pieces 94c, and the first lid member 94 is fixed to the case main body 91.

The cover main body 94a is formed with a through hole 94b nearly at the center part penetrating in the thickness direction. The output shaft 33 is inserted into the through hole 94b. Therefore, the case 90 accommodates the output unit 30 and any other components with the output shaft 33 exposed. The through hole 94b has a width that accepts the insertion of the output shaft 33 and a length that permits the output shaft 33 to move as described above.

The first lid member 94 has mounted pieces 94d and 94d at positions overlapped with the mounted pieces 91a and 91a. The mounted pieces 94d and 94d each have a through hole penetrating in the thickness direction. The through holes are overlapped with the through holes of the mounted pieces 91a and 91a.

The second lid member 95 has an outer shape approximately the same as the circuit board 80. On the outer edge of the face of the second lid member 95 on the case main body 91 side, a projection 95a having an outer circumference overlapped with the inner circumferential surface of the frame 93 is continuously provided. Nails 95b provided on the projection 95a are fit to the recesses 93d provided on the inner circumferential surface of the frame 93, and the second lid member 95 is fixed to the case main body 91.

Next, the arrangement of the members in the case 90 will be described.

Between the case main body 91 and the first lid member 94, the output unit 30, the first worm 40, the second worm 50, the first driving mechanism 60, the second driving mechanism 70, and any other members are placed. Specifically, the arrangement is as below.

As illustrated in FIG. 12, at the positions on the projection 92c side from the center of the face on the first lid member 94 side of the middle plate 92, support projections 111, 112, and 113 are provided arrayed on a straight line in the front-back direction. The support projection 111 is provided on the side where the connector lid 93a is provided. The support projection 113 is provided on the side where the barrel-like projection 93b is provided. The support projection 112 is provided between the support projection 111 and the support projection 113.

Figure 14:
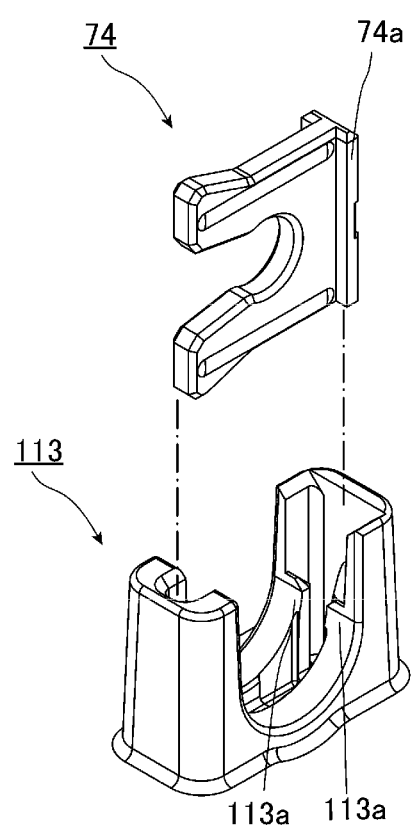
FIG. 14 is an exploded perspective view of a fixing member and a support projection alone.

The support projection 113 has a groove matched with the outer shape of the fixing member 74. In order to describe a method of fixing the fixing member 74 to the support projection 113, FIG. 14 is an exploded perspective view of the fixing member 74 and the support projection 113 alone. As illustrated in FIG. 14, in the groove formed on the support projection 113, at the position where a projection 74a of the fixing member 74 is inserted, a pair of supports 113a is formed protruding on the inner side of the support projection 113 in the thickness direction corresponding to the shape of the projection 74a. The pair of supports 113a regulates the motion of the projection 74a, and this easily fixes the fixing member 74 to the support projection 113. The fixing member 74 is inserted into the groove of the support projection 113 as described above, with the fixing member 74 fit to the shaft member 71. Thus, the fixing member 74 is fixed in such a manner that its rotation is regulated, and the position of the shaft member 71 is fixed.

The fixing member 55 is fixed to the support projection 111 similarly to the fixing member 74. That is, the support projection 111 has a groove matched with the outer shape of the fixing member 55. The fixing member 55 is inserted into the groove with the fixing member 55 fit to the second worm 50. Thus, the fixing member 55 is fixed in such a manner that its rotation is regulated, and the position of the second worm 50 is fixed. However, the fixing members 55 and 74 are fixed in such a manner that the projection 74a of the fixing member 74 and the projection of the fixing member 55 are located on the opposite sides to each other to the second worm 50 and the shaft member 71.

Note that, the second worm 50 and the shaft member 71 are fixed with the shaft part of the shaft member 71 inserted into the hollow portion of the second worm 50. The portion where the gear 52 of the second worm 50 is not formed is supported on the groove of the support projection 112 in such a manner that the second worm 50 is rotatable.

The output unit 30 is placed between the case main body 91 and the first lid member 94 with the component members assembled on the output unit 30. That is, as illustrated in FIG. 6, the output shaft member 31 is overlapped with the accommodating member 35. The bearing 101, the bearing 102, the guide shaft 100, the first worm 40, and the fixing member 45 are mounted on the accommodating member 35, and the shaft part 61a of the shaft member 61 to which the fixing member 64 is fit is inserted into the hollow portion of the first worm 40. In this state, the guide shaft 100 and the fixing member 64 are supported on the support projections and any other components provided on the case 90. The detail is as below.

In nearly the center of the face on the first lid member 94 side of the middle plate 92, a support projection 114 is provided. The support projection 114 facilitates the assembly of the output unit 30 by supporting the guide shaft 100 in placing the output unit 30. In the frame 93, the inner circumferential surface at the position where the barrel-like projection 93b is formed protrudes on the outer circumferential surface side to form a recess 115, and a support projection 116 having a groove continuing to the recess 115 is formed on the middle plate 92. One end portion of the guide shaft 100 is supported on the recess 115 and the groove of the support projection 116. On the inner circumferential surface of the frame 93 at the position where the connector lid 93a is formed, a recess, not shown, recessed toward the outer circumferential surface side is formed. The other portion of the guide shaft 100 is supported on the recess. On the face of the middle plate 92 on the first lid member 94 side, a support projection 117 having a groove matched with the outer shape of the fixing member 64 is formed. The fixing member 64 is inserted into the groove. The fixing member 64 is fixed in such a manner that its rotation is regulated. As described above, the output unit 30 is placed between the case main body 91 and the first lid member 94.

As illustrated in FIG. 5, the motor 63 is fixed in which a tubular protrusion 118 erected from the middle plate 92 to the first lid member 94 side is inserted into the center of the core assembly 63a. Similarly to the motor 63, the motor 73 is fixed to a tubular protrusion 119 erected from the middle plate 92 to the first lid member 94 side. The transmission gear 62 is inserted into a pin 121. One end portion of the pin 121 is inserted into a recess 120 formed on the middle plate 92. The transmission gear 72 is inserted into a pin 123. One end portion of the pin 123 is inserted into a recess 122 formed on the middle plate 92. Note that, the pin 121 is overlapped with the rotation axis of the transmission gear 62, and the pin 123 is overlapped with the rotation axis of the transmission gear 72.

As described above, the members are placed between the case main body 91 and the first lid member 94. Note that, the first and the second worms 40 and 50 are placed in such a manner that the rotation axis is in parallel with the longitudinal direction of the guide shaft 100. The motor 63, the motor 73, the transmission gear 62, and the transmission gear 72 are placed in the direction orthogonal to the longitudinal direction of the first and the second worms 40 and 50 to the first and the second worms 40 and 50.

As described above, after the first lid member 94 is placed over the case main body 91 on which the members are placed, the protrusion provided on the face of the cover main body 94a on the case main body 91 side is pressed against the members placed on the case main body 91. Specifically, as illustrated in FIG. 13, on the face of the cover main body 94a on the case main body 91 side, a rib 130 that contacts the fixing member 45, a projection 131 that contacts the fixing member 55, a projection 132 that contacts the fixing member 64, a projection 133 that contacts the fixing member 74, a projection 134 that contacts the pin 121, and a projection 135 that contacts the pin 123 are formed. As described above, the fixing member 45, the fixing member 55, the fixing member 64, and the fixing member 74 that also serve as the bearing are fixed sandwiched by the middle plate 92 and the first lid member 94. Thus, the displacement of the rotation axes of the first worm 40, the second worm 50, the shaft member 61, and the shaft member 71 is reduced, and the operational accuracy of the rotation and movement of the output shaft 33 is improved. The pins 121 and 123 are fixed sandwiched by the middle plate 92 and the first lid member 94. Thus, the lift of the transmission gears 62 and 72 is reduced, and this enables the elimination of the event in which the driving force is not appropriately transmitted from the first and the second driving mechanisms 60 and 70 to the first and the second worms 40 and 50.

Note that, since the fixing member 45 is moved with the movement of the output unit 30, the rib 130 that contacts the fixing member 45 is provided throughout the moving range of the fixing member 45. That is, the first worm 40 is moved with the movement of the output unit 30, and the fixing member 45 is moved together in a predetermined direction orthogonal to the rotation axis 33a of the output shaft 33. However, during the movement of the fixing member 45 as described above, the fixing member is in contact with the rib 130. Therefore, when the output unit 30 and the first worm 40 are moved together in a predetermined direction, the fixing member 45 is slid over the case 90. As described above, the fixing member 45 is in contact with the case 90 and slid over the case 90 when the output unit 30 is moved, and this eliminates the displacement of the rotation axis of the first worm 40. As a result, this enables the improvement of the operational accuracy of rotating the output shaft 33 even though the output unit 30 is moved. Note that, in the embodiment, since the fixing member 45 also functions as the bearing, the fixing member 45 is configured of an antiabrasion material. An example of a material that configures the fixing member 45 includes polyacetal.

The cover main body 94a is also formed with a protrusion 136 to be inserted into the recess 115. The protrusion 136 is inserted into the recess 115, and the guide shaft 100 is pressed against the connector lid 93a side by the protrusion 136. Thus, this eliminates the displacement of the position of the guide shaft 100.

As illustrated in FIG. 5, between the case main body 91 and the second lid member 95, the circuit board 80 and the electronic components 81, 82, and 83, the connector 84, and any other components placed on the circuit board 80 are placed. The circuit board 80 is fixed between the case main body 91 and the second lid member 95 by press fitting a protrusion 80a provided on the second lid member 95 side of the middle plate 92 to a through hole 80b formed on the circuit board 80 and by press fitting a protrusion 80d provided on the second lid member 95 side of the middle plate 92 to a notch 80e formed on the circuit board 80. Note that, the end portion of the protrusion 80a is inserted into a recess 80c of the second lid member 95, and the end portion of the protrusion 80d is inserted into a recess 80f of the second lid member 95.

Note that, in the electronic components placed on the circuit board 80, the electronic components 81, 82, and 83 are placed protruding above the position where the first worm 40 or the second worm 50 is placed, and are placed on the opposite side of the output shaft 33 of the second worm 50. Specifically, the electronic components 81, 82, and 83 are placed in the space formed of the projection 92c. As described above, the second worm 50 is placed close to the output shaft 33 side. The electronic components 81, 82, and 83 that are radial components are placed in the space formed by placing the second worm 50 close to the output shaft 33 side, this enables effective use of the space in the case 90, and this easily achieves a reduction in the size of the actuator 20.

As described above, in the actuator 20 according to the embodiment, the electronic components 81, 82, and 83 that are radial components, the motors 63 and 73, and any other components are also placed in the direction orthogonal to the longitudinal direction to the first and the second worms 40 and 50. As described above, in the members configuring the actuator 20, the members having a large volume are placed in the direction orthogonal to the longitudinal direction to the first and the second worms 40 and 50, and this enables a reduction in the length of the actuator 20 in the front-back direction. When a reduction in the length of the actuator 20 in the front-back direction is achieved, the length of the lamp 1 in the front-back direction can be reduced. Thus, advantages, such as an increased vehicle interior space, can be achieved.

Next, a method of mounting the actuator 20 on the bracket 15 will be described.

As described above, the case 90 of the actuator 20 has the barrel-like projection 93b, the mounted pieces 91a and 91a, and the mounted pieces 94d and 94d. As illustrated in FIG. 1, in mounting the actuator 20 on the bracket 15, first, the barrel-like projection 93b is inserted into the through hole 15a of the bracket 15. After that, the actuator 20 is rotated while pressed to the bracket 15 side as the barrel-like projection 93b is a pivot. As illustrated in FIG. 3, a bolt 15c is inserted into the through holes of the mounted pieces 91a and 91a and the mounted pieces 94d and 94d, the bolt 15c is screwed into the bracket 15, and then the actuator 20 can be fixed to the bracket 15. As described above, the actuator 20 is supported on the bracket 15 at three points with the mounted pieces 91a and 91a and the mounted pieces 94d and 94d provided on both sides of the connector 84 and the barrel-like projection 93b provided on the opposite side of the connector 84.

Next, the operation of the actuator 20 and the lamp 1 will be described.

Figure 15A:
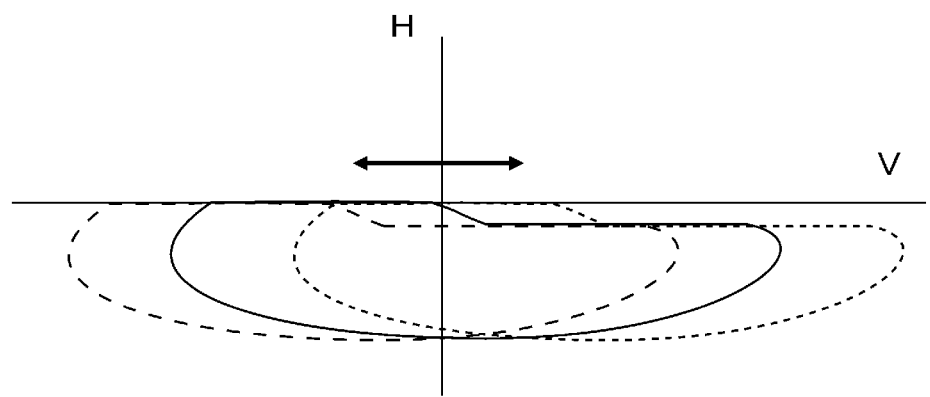
FIG. 15A is a diagram of the lighting range of a light beam emitted from the lamp according to the embodiment.

After power is carried from a power supply circuit, not shown, to the motor 63 through the connector 84 and the motor 63 is rotated, the transmission gear 62 and the shaft member 61 are interlocked and rotated, and driving force is transmitted to the first worm 40. After the first worm 40 is rotated, the output shaft member 31 having the helical gear 34a meshed with the first worm 40 is rotated. That is, the output shaft 33 is rotated. The output shaft 33 is rotated, and the lamp unit 2 connected through the connection projection 2b is rotated. As described above, the lamp unit 2 is rotated to change the lighting range of the light beam from the lamp unit 2. FIG. 15A is a diagram illustrating a change in the lighting range of the light beam from the lamp unit 2 when the lamp unit 2 is rotated. For example, in the case in which a light beam emitted from the lamp unit 2 initially lights the position depicted by a solid line, the output shaft 33 is rotated to turn the lamp unit 2, and the range indicated by a broken line or a dotted line can be lit corresponding to the rotation direction.

Figure 15B:
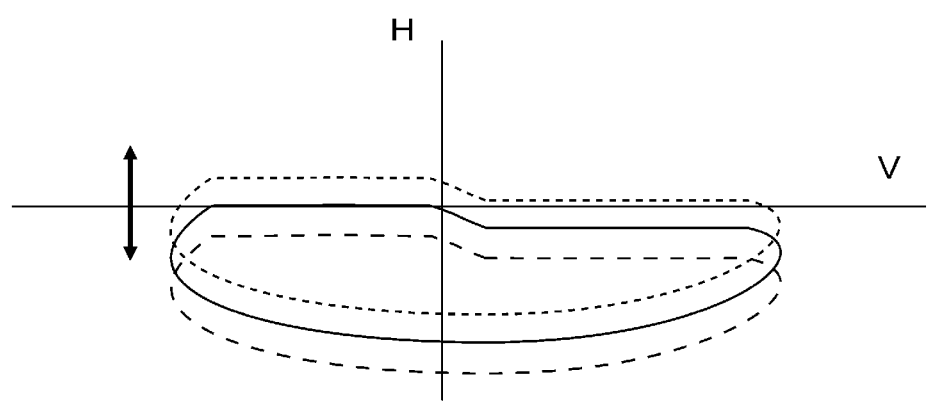
FIG. 15B is a diagram of the lighting range of a light beam emitted from the lamp according to the embodiment.

On the other hand, after power is carried from the power supply circuit, not shown, to the motor 73 through the connector 84 and the motor 73 is rotated, the transmission gear 72 and the shaft member 71 are interlocked and rotated, and driving force is transmitted to the second worm 50. After the second worm 50 is rotated, the accommodating member 35 having the helical gear rack 39 meshed with the second worm 50 is moved in the direction orthogonal to the rotation axis 33a. That is, the output shaft 33 is moved in the front-back direction orthogonal to the rotation axis 33a. The output shaft 33 is moved as described above, and the lamp unit 2 connected through the connection projection 2b is moved to or fro as the supported projection 2a is the center. As described above, the lamp unit 2 is moved to or fro, and the lighting range of the light beam from the lamp unit 2 can be changed. FIG. 15B is a diagram illustrating a change in the lighting range of the light beam from the lamp unit 2 when the lamp unit 2 is moved to or fro. For example, in the case in which a light beam emitted from the lamp unit 2 initially lights the position depicted by a solid line, the output shaft 33 is moved forward to advance the lamp unit 2, and the direction in which the light beam is emitted is lifted to light the range indicated by a dotted line. On the other hand, the output shaft 33 is moved backward to retract the lamp unit 2, and the direction in which the light beam is emitted is lowered to light the range indicated by a broken line.

Note that, in the actuator of Patent Literature 1, in order to rotate or move the output shaft, a pair of worms provided sandwiching the output shaft is used. These worms are rotated about the rotation axis in the plane orthogonal to the rotation axis of the output shaft when the output shaft is rotated or moved. The rotation of these worms is converted into force in a predetermined direction through gears and any other components, the force is conducted to the output shaft, and the output shaft is rotated or moved. In the actuator of Patent Literature 1, the worms contact the member having the output shaft in the plane in parallel with the rotation axis of the output shaft between the worms and the output shaft. Therefore, when the worm is rotated, force in the direction nearly in parallel with the rotation axis of the output shaft is applied to the output shaft. When such force applied to the output shaft is increased, the output shaft might be rattled.

On the other hand, as described above, in the actuator 20, the second worm 50 is meshed with the helical gear rack 39 that is a moving mechanism provided on the output unit 30, and moves the output shaft 33 in the direction orthogonal to the rotation axis 33a of the output shaft 33. The helical gear rack 39 is formed on the face in parallel with the rotation axis 33a of the output shaft between the output unit 30 and the second worm 50. Therefore, when the output shaft 33 is moved by the second worm 50 as described above, the second worm 50 is rotated, and the output shaft 33 is applied with force in the direction in parallel with the rotation axis 33a of the output shaft 33. However, in the actuator 20, since the distance between the output shaft 33 and the second worm 50 is short, the force of the second worm 50 in the rotation direction conducted from the second worm 50 to the output shaft 33 is small, and a rattle of the output shaft 33 is reduced.

In the actuator 20 according to the embodiment, the helical gear rack 39 formed on the output unit 30 is used as a moving mechanism that moves the output shaft 33 in a predetermined direction. The helical gear rack easily secures the relative moving range of the member having the helical gear rack to the worm even though the distance to the worm meshed with the helical gear rack is short. Thus, the helical gear rack 39 formed on the output unit 30 is used as a moving mechanism that moves the output shaft 33 in a predetermined direction, and this easily secures the moving range of the output shaft 33 even though the helical gear rack 39 is provided at the position near the output shaft 33. Therefore, the second worm 50 is easily brought close to the output shaft 33, and this more easily achieves the elimination of a rattle of the output shaft 33.

In the lamp 1 according to the embodiment, a rattle of the output shaft 33 of the actuator 20 connected to the lamp unit 2 is eliminated as described above, and this improves the stability of the operation of the lamp unit 2.

As described above, the present invention is described using the preferred embodiment as an example. However, the present invention is not limited to the embodiment. For example, the moving mechanism is not limited to the helical gear rack. However, the helical gear rack is used as a moving mechanism as described above, and this easily eliminates a rattle of the output shaft. The position to form the helical gear rack that functions as a moving mechanism is not limited specifically as long as the position is the position at which the helical gear rack can be meshed with the second worm. However, the helical gear rack is preferably formed on the shortest line connecting the output shaft to the second worm as described above. The positions to place the electronic components are not limited as well. However, from the viewpoint of a reduction in the size of the actuator or shortening the length in the front-back direction, for example, the electronic components are preferably provided at the positions described above.

The self-aligning bearing mechanism according to the embodiment is described using an example in which one side of the bearing accommodating part along the first axial direction is opened in the width at least the shaft inserted into the bearing is passed in the section in which the bearing externally reaches the bearing holding space. However, the bearing accommodating part does not necessarily have to be opened as described above. However, from the viewpoint of easily installing the bearing, for example, a part of the bearing accommodating part is preferably opened as described above. The outer shape of the bearing configuring the self-aligning bearing mechanism is not limited specifically. In the self-aligning bearing mechanism, the first axial direction only has to intersect with the second axial direction. The first axial direction and the second axial direction are not limited to the form in which the directions are orthogonal to each other.

In the foregoing embodiment, the case is shown in which the self-aligning bearing mechanism is used in the actuator of the vehicle headlight. However, the application of the self-aligning bearing mechanism and the application of the actuator are not limited specifically.

In the foregoing embodiment, the description is made using an example in which a plurality of protrusions is formed on the outer circumferential surface of the fixing member. However, the fixing member according to the present invention only has to include an engaging part engageable with the support that supports the rotating member on the outer circumferential surface. Therefore, for example, a form is possible in which the support has projections and recesses that engage with the projections are formed on the outer circumferential surface of the fixing member.

In the foregoing embodiment, the description is made using an example in which the fixing member is slid. However, the fixing member according to the present invention is not limited to the form in which the fixing member is configured of a material of slidability. In the foregoing embodiment, an example is taken in which the fixing member is used in the vehicle headlight. However, the application of the fixing member according to the present invention is not limited specifically as long as the application is the application in which a bar-like rotating member that is rotated about the rotation axis along the longitudinal direction is rotatably fixed to the support.

In the foregoing embodiment, the case is shown in which the actuator is used in the vehicle headlight. However, the application of the actuator is not limited specifically.

As described above, in accordance with the present invention, a self-aligning bearing mechanism that easily achieves the centering of a shaft, a fixing member that enables the highly accurate fixing of a rotating member, such as a worm, an actuator that eliminates a rattle of an output unit, and a lamp equipped with the actuator are provided. The self-aligning bearing mechanism, the fixing member, the actuator, and the lamp are preferably used in a vehicle headlight, for example.

REFERENCE SIGNS LIST

1 . . . vehicle headlight (lamp)
2 . . . lamp unit
3 . . . light source unit
10 . . . case
15 . . . bracket
20 . . . actuator
30 . . . output unit
33 . . . output shaft
33a . . . rotation axis
34a . . . helical gear (rotating mechanism)
35b . . . bearing accommodating part
35c . . . bearing holding space
35e . . . inner wall
39 . . . helical gear rack (moving mechanism)
40 . . . first worm
45 . . . fixing member
50 . . . second worm
60 . . . first driving mechanism
64 . . . fixing member
70 . . . second driving mechanism
80 . . . circuit board
81, 82, 83 . . . electronic component
90 . . . case
91 . . . case main body
94 . . . first lid member
95 . . . second lid member
100 . . . guide shaft
102 . . . bearing

The invention claimed is:

1. An actuator comprising:
an output unit having an output shaft; and
a first worm and a second worm extending along a face perpendicular to the output shaft, wherein:
the output unit includes
a flange;
a rotating mechanism configured to be meshed with the first worm to rotate the output shaft about a predetermined rotation axis, and
a moving mechanism configured to be meshed with the second worm to move the output shaft in a direction orthogonal to the rotation axis;
the first worm and the second worm are placed to sandwich the output shaft;
a distance between the second worm and the output shaft is shorter than a distance between the first worm and the output shaft;
the moving mechanism has a helical gear rack formed on a face opposed to the second worm in the output unit, the helical gear rack configured to be meshed with the second worm; and
the flange extends in a direction orthogonal to the rotation axis and overlaps the entire helical gear rack in a direction parallel to the rotation axis.

2. The actuator according to claim 1, wherein the helical gear rack is formed on a shortest line connecting the output shaft to the second worm.

3. The actuator according to claim 1, wherein:
the actuator has a circuit board;
the first worm and the second worm are placed on one face side of the circuit board; and
in electronic components placed on the circuit board, an electronic component is placed protruding above a position where the first worm or the second worm is placed, and the electronic component is placed on an opposite side of the output shaft of the second worm.

4. A lamp comprising:
the actuator according to claim 1; and
a lamp unit having a light source, the lamp unit being connected to the output shaft of the actuator.

* * * * *